United States Patent
Park et al.

(10) Patent No.: US 9,560,576 B2
(45) Date of Patent: Jan. 31, 2017

(54) METHOD AND DEVICE FOR PERFORMING CHANNEL ACCESS IN WIRELESS LAN

(71) Applicant: LG ELECTRONICS INC., Seoul (KR)

(72) Inventors: Giwon Park, Seoul (KR); Kiseon Ryu, Seoul (KR); Jinsoo Choi, Seoul (KR); Hangyu Cho, Seoul (KR); Jinsam Kwak, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 11 days.

(21) Appl. No.: 14/418,054

(22) PCT Filed: Aug. 26, 2013

(86) PCT No.: PCT/KR2013/007628
§ 371 (c)(1),
(2) Date: Jan. 28, 2015

(87) PCT Pub. No.: WO2014/030983
PCT Pub. Date: Feb. 27, 2014

(65) Prior Publication Data
US 2015/0172996 A1    Jun. 18, 2015

Related U.S. Application Data

(60) Provisional application No. 61/692,714, filed on Aug. 24, 2012, provisional application No. 61/696,227, filed on Sep. 3, 2012, provisional application No. 61/764,550, filed on Feb. 14, 2013, provisional application No. 61/765,037, filed on Feb. 15, 2013, provisional application No. 61/803,416, filed on Mar. 19, 2013.

(51) Int. Cl.
*H04W 74/08*    (2009.01)
*H04W 48/06*    (2009.01)
(Continued)

(52) U.S. Cl.
CPC ......... *H04W 48/06* (2013.01); *H04W 74/0875* (2013.01); *H04W 48/12* (2013.01); *H04W 74/006* (2013.01); *H04W 84/12* (2013.01)

(58) Field of Classification Search
None
See application file for complete search history.

(56) References Cited

U.S. PATENT DOCUMENTS 7,843,819 B1 * 11/2010 Benveniste ........... H04L 1/1861
                                                 370/230
7,978,673 B1 *  7/2011 Uhlik ................... H04W 72/04
                                                 370/341
(Continued)

FOREIGN PATENT DOCUMENTS

KR    10-2009-0080386    7/2009
KR    10-2009-0092434    9/2009
(Continued)

OTHER PUBLICATIONS

PCT International Application No. PCT/KR2013/007628, Written Opinion of the International Searching Authority dated Dec. 2, 2013, 1 page.

*Primary Examiner* — Huy D Vu
*Assistant Examiner* — Bao G Nguyen
(74) *Attorney, Agent, or Firm* — Lee Hong Degerman Kang & Waimey

(57) ABSTRACT

A method and device for performing channel access in a wireless LAN are disclosed. An initial channel access method of a station STA in a wireless LAN may include: receiving, from an access point (AP) by the station STA, a frame including information on a channel state, information on a channel access protection section and information on a station STA capable of performing channel access in the channel access protection section; determining a channel access priority by a station STA when the information on the channel state indicates that a wireless link is in a congestion state; and performing initial channel access in the channel (Continued)

access protection section based on the channel access priority determined by the station STA and the information on the station STA capable of performing channel access in the channel access protection section.

10 Claims, 23 Drawing Sheets

(51) Int. Cl.
*H04W 84/12* (2009.01)
*H04W 48/12* (2009.01)
*H04W 74/00* (2009.01)

(56) References Cited

U.S. PATENT DOCUMENTS

| | | | | |
|---|---|---|---|---|
| 2006/0274680 | A1* | 12/2006 | Zhu | H04B 7/005 370/278 |
| 2009/0122708 | A1* | 5/2009 | Wang | H04L 12/5695 370/237 |
| 2010/0118698 | A1* | 5/2010 | Yokobori | H04W 74/085 370/230 |
| 2011/0299481 | A1 | 12/2011 | Kim et al. | |

FOREIGN PATENT DOCUMENTS

| | | |
|---|---|---|
| KR | 10-2009-0128304 | 12/2009 |
| WO | 2011/099798 | 8/2011 |

* cited by examiner

FIG. 1
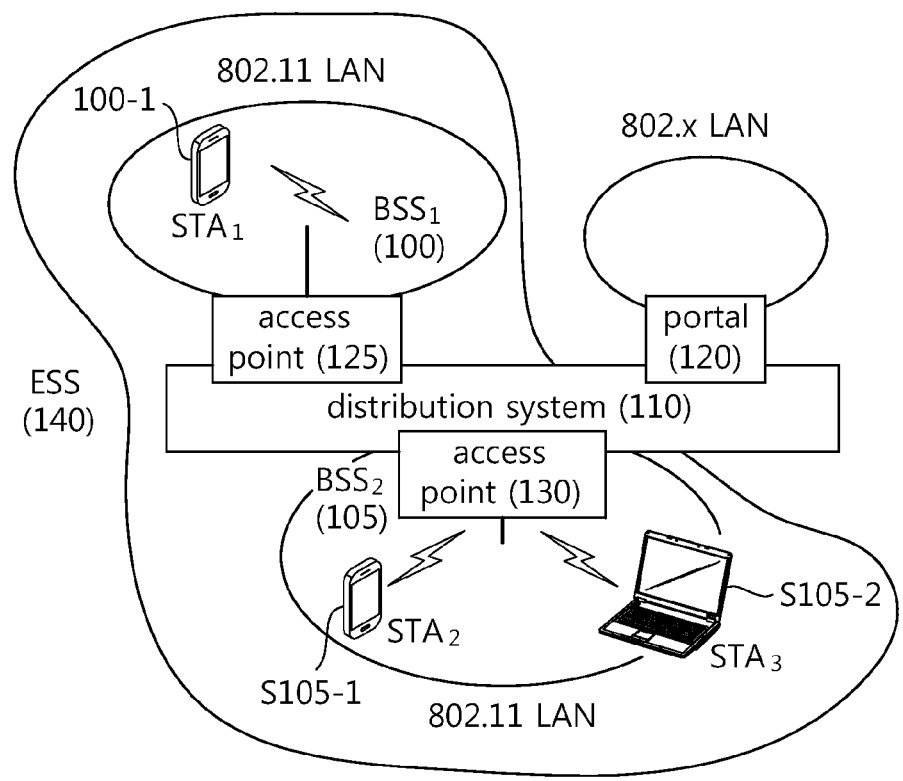
(A)
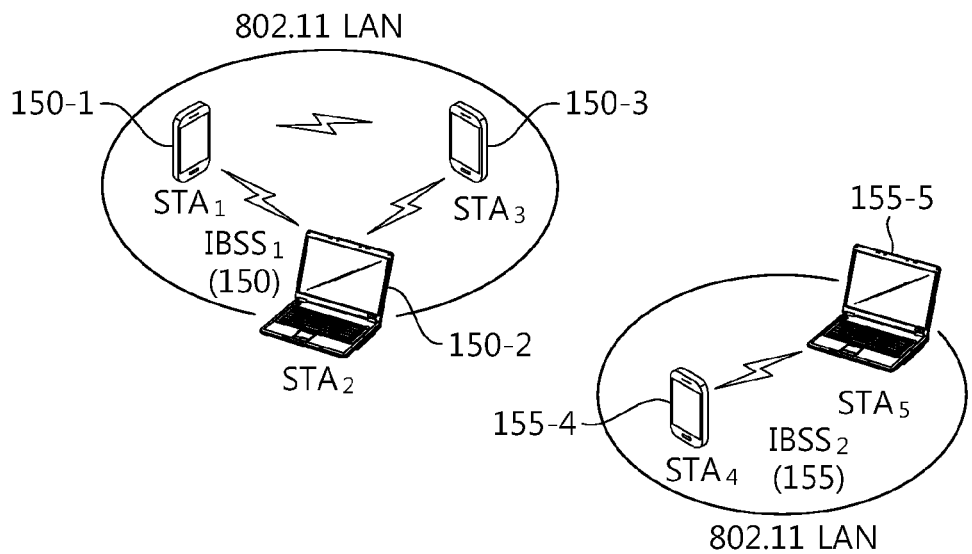
(B)

FIG. 6
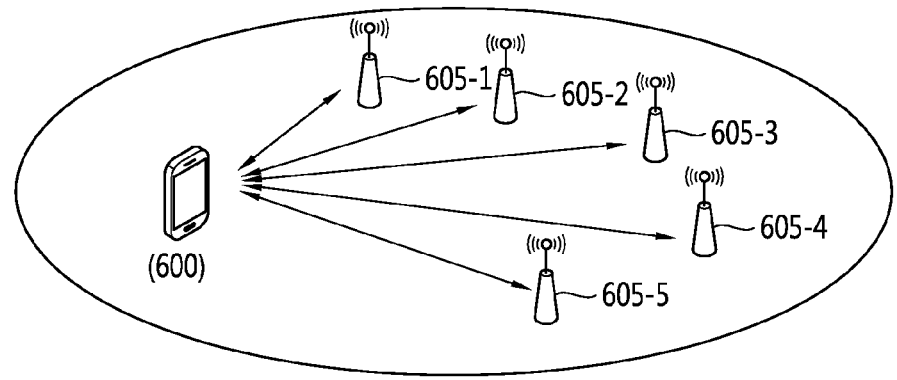
probe request frame (610)
(wildcard, SSID, wildcard BSSID)    (A)
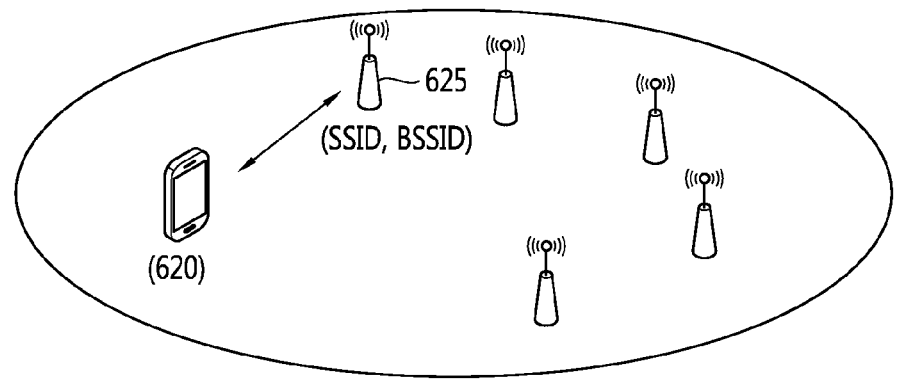
probe request frame(630)
(SSID, BSSID)    (B)
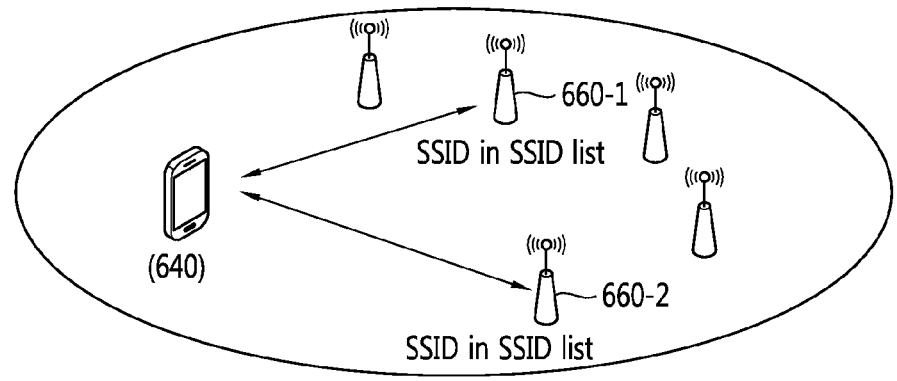
probe request frame (660)
(SSID, wildcard BSSID)    (C)

METHOD AND DEVICE FOR PERFORMING CHANNEL ACCESS IN WIRELESS LAN

CROSS-REFERENCE TO RELATED APPLICATIONS

This application is the National Stage filing under 35 U.S.C. 371 of International Application No. PCT/KR2013/007628, filed on Aug. 26, 2013, which claims the benefit of U.S. Provisional Application Ser. Nos. 61/692,714, filed on Aug. 24, 2012, 61/696,227, filed on Sep. 3, 2012, 61/764,550, filed on Feb. 14, 2013, 61/765,037, filed on Feb. 15, 2013 and 61/803,416, filed on Mar. 19, 2013, the contents of which are all hereby incorporated by reference herein in their entirety.

BACKGROUND OF THE INVENTION

Field of the Invention

The present invention relates to a method and a device for performing channel access, and more particularly, to a method and a device for performing channel access of a station (STA).

Related Art

In recent years, an evolution direction of a wireless LAN technique has been largely progressed into three directions. As an effort for further increasing a transmission speed on an extension line of the wireless LAN evolution direction in the related art, IEEE (institute of electrical and electronic engineers) 802.11ac and IEEE 802.11ad are provided. The IEEE 802.11ad is a wireless LAN technique using a 60 GHz band. Further, a wideband wireless LAN using a frequency band less than 1 GHz to enable wideband transmission distantively rather than the wireless LAN in the related art has been come to the fore in recent years and includes IEEE 80.211af using a TV white space (TVWS_band and IEEE 802.11ah using a 900 MHz band. The wideband LANs mainly aim at extension of a extended range Wi-Fi service in addition to a smart grid, and an wideband sensor network. Further, a wireless LAN medium access control (MAC) technique in the related art has a problem that an initial link setup time is significantly lengthened in some cases. An IEEE 802.11ai standardization activity has been recently in progress in order for an STA to rapidly access an AP by solving the problem.

A standardization activity of IEEE 802.11 ai as an MAC technique that handles a rapid authentication procedure in order to epochally save an initial set-up and association time of the wireless LAN has been started as a legal task group in January 2011. In order to enable a rapid access procedure, the IEEE 802.11ai has discussed procedure simplification in regions such as AP discovery, network discovery, time synchronization function (TSF) synchronization, authentication and association, procedure merge with a higher layer, and the like. Among them, ideas including procedure merge using piggyback of a dynamic host configuration protocol (DHCP), optimization of a full extensible authentication protocol (EAP) using a concurrent IP, efficient selective access point (AP) scanning, and the like have been actively discussed.

SUMMARY OF THE INVENTION

The present invention provides a channel access method. The present invention also provides an apparatus for performing a channel access method.

In order to achieve the object of the present invention, in an aspect, provided is a method in which a station (STA) performs initial channel access in a wireless LAN. The method includes: receiving, by the STA, a frame including information on a channel status, information on a protected channel access interval, and information on an STA which is accessible to a channel in the protected channel access interval, from an access point (AP); deciding, by the STA, a channel access priority when the information on the channel status indicates that a radio link is congested; and performing, by the STA, the initial channel access in the protected channel access interval based on the decided channel access priority and the information on the STA which is accessible to the channel in the protected channel access interval, wherein the information on the protected channel access interval includes information on a time limited so as for only the STA which is accessible to the channel in the protected channel access interval to performs channel access.

In order to achieve the object of the present invention, in another aspect, provided is a station for performing scanning in a wireless LAN. The station includes: an RF unit receiving a radio signal; and a processor selectively connected with the RF unit, wherein the processor is implemented to receive a frame including information on a channel status, information on a protected channel access interval, and information on an STA which is accessible to a channel in the protected channel access interval, from an access point (AP), decide a channel access priority when the information on the channel status indicates that a radio link is congested, and perform initial channel access in the protected channel access interval based on the decided channel access priority and the information on the STA which is accessible to the channel in the protected channel access interval, and the information on the protected channel access interval includes information on a time limited so as for only the STA which is accessible to the channel in the protected channel access interval to performs channel access.

Initial link setup can be rapidly performed.

BRIEF DESCRIPTION OF THE DRAWINGS

FIG. 1 is a conceptual diagram illustrating a structure of a wireless local area network (WLAN).

FIG. 6 is a conceptual diagram illustrating a method for transmitting a probe request frame.

DESCRIPTION OF EXEMPLARY EMBODIMENTS

FIG. 1 is a concept view illustrating the structure of a wireless local area network (WLAN).

FIG. 1(A) shows the structure of the IEEE (institute of electrical and electronic engineers) 802.11 infrastructure network.

Referring to FIG. 1(A), the WLAN system may include one or more basic service sets (BSSs, 100 and 105). The BSS 100 or 105 is a set of an AP such as AP (access point) 125 and an STA such as STA1 (station) 100-1 that may successfully sync with each other to communicate with each other and is not the concept to indicate a particular area. The BSS 105 may include one AP 130 and one or more STAs 105-1 and 105-2 connectable to the AP 130.

The infrastructure BSS may include at least one STA, APs 125 and 130 providing a distribution service, and a distribution system (DS) 110 connecting multiple APs.

The distribution system 110 may implement an extended service set (ESS) 140 by connecting a number of BSSs 100 and 105. The ESS 140 may be used as a term to denote one network configured of one or more APs 125 and 230 connected via the distribution system 110. The APs included in one ESS 140 may have the same SSID (service set identification).

The portal 120 may function as a bridge that performs connection of the WLAN network (IEEE 802.11) with other network (for example, 802.X).

In the infrastructure network as shown in FIG. 1(A), a network between the APs 125 and 130 and a network between the APs 125 and 130 and the STAs 100-1, 105-1, and 105-2 may be implemented. However, without the APs 125 and 130, a network may be established between the STAs to perform communication. The network that is established between the STAs without the APs 125 and 130 to perform communication is defined as an ad-hoc network or an independent BSS (basic service set).

FIG. 1(B) is a concept view illustrating an independent BSS.

Referring to FIG. 1(B), the independent BSS (IBSS) is a BSS operating in ad-hoc mode. The IBSS does not include an AP, so that it lacks a centralized management entity. In other words, in the IBSS, the STAs 150-1, 150-2, 150-3, 155-4, and 155-5 are managed in a distributed manner. In the IBSS, all of the STAs 150-1, 150-2, 150-3, 155-4, and 155-5 may be mobile STAs, and access to the distribution system is not allowed so that the IBSS forms a self-contained network.

The STA is some functional medium that includes a medium access control (MAC) following the IEEE (Institute of Electrical and Electronics Engineers) 802.11 standards and that includes a physical layer interface for radio media, and the term "STA" may, in its definition, include both an AP and a non-AP STA (station).

The STA may be referred to by various terms such as mobile terminal, wireless device, wireless transmit/receive unit (WTRU), user equipment (UE), mobile station (MS), mobile subscriber unit, or simply referred to as a user.

Figure 2:
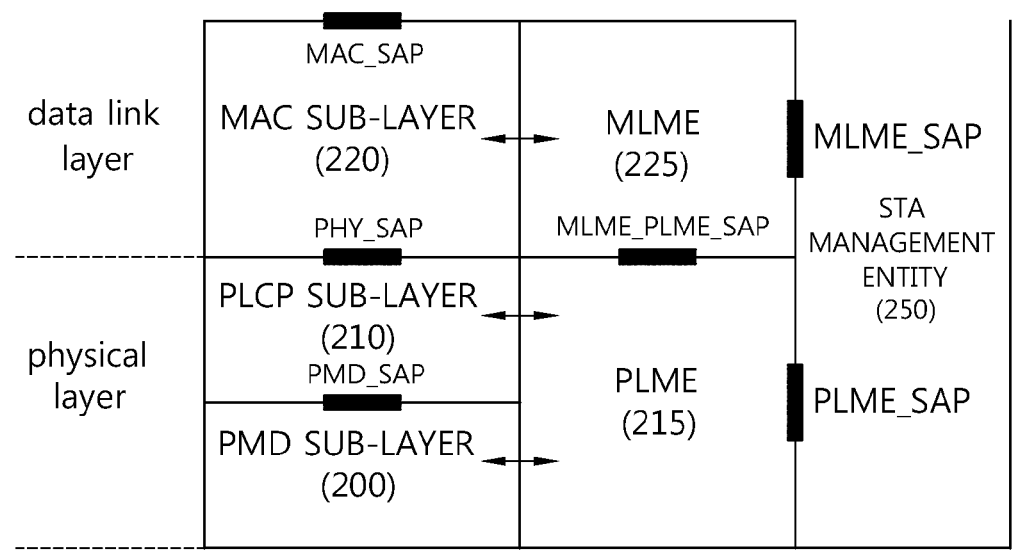
FIG. 2 is a diagram illustrating a hierarchical architecture of a wireless LAN system supported by IEEE 802.11.

FIG. 2 is a view illustrating a layer architecture of a WLAN system supported by IEEE 802.11.

FIG. 2 conceptually illustrates a layer architecture (PHY architecture) of a WLAN system.

The WLAN system layer architecture may include an MAC (medium access control) sub-layer 220, a PLCP (Physical Layer Convergence Procedure) sub-layer 210, and a PMD (Physical Medium Dependent) sub-layer 200. The PLCP sub-layer 210 is implemented so that the MAC sub-layer 220 is operated with the minimum dependency upon the PMD sub-layer 200. The PMD sub-layer 200 may serve as a transmission interface to communicate data between a plurality of STAs.

The MAC sub-layer 220, the PLCP sub-layer 210, and the PMD sub-layer 200 may conceptually include management entities.

The management entity of the MAC sub-layer 220 is denoted an MLME (MAC layer management entity, 225), and the management entity of the physical layer is denoted a PLME (PHY layer management entity, 215). Such management entities may offer an interface where a layer management operation is conducted. The PLME 215 is connected with the MLME 225 to be able to perform a management operation on the PLCP sub-layer 210 and the PMD sub-layer 200, and the MLME 225 is also connected with the PLME 215 to be able to perform a management operation on the MAC sub-layer 220.

There may be an SME (STA management entity, 250) to perform a proper MAC layer operation. The SME 250 may be operated as a layer independent component. The MLME, PLME, and SME may communicate information between the mutual components based on primitive.

The operation of each sub-layer is briefly described below. The PLCP sub-layer 110 delivers an MPDU (MAC protocol data unit) received from the MAC sub-layer 220 according to an instruction from the MAC layer between the MAC sub-layer 220 and the PMD sub-layer 200 to the PMD sub-layer 200 or delivers a frame from the PMD sub-layer 200 to the MAC sub-layer 220. The PMD sub-layer 200 is a PLCP sub-layer and the PMD sub-layer 200 may communicate data between a plurality of STAs by way of a radio medium. The MPDU (MAC protocol data unit) delivered from the MAC sub-layer 220 is denoted a PSDU (Physical Service Data Unit) on the side of the PLCP sub-layer 210. The MPDU is similar to the PSDU, but in case an A-MPDU (aggregated MPDU), which is obtained by aggregating a plurality of MPDUs, has been delivered, each MPDUs may differ from the PSDU.

The PLCP sub-layer 210 adds an additional field including information required by the physical layer transceiver while receiving the PSDU from the MAC sub-layer 220 and delivering the same to the PMD sub-layer 200. In this case, the added field may include a PLCP preamble to the PSDU, a PLCP header, and tail bits necessary to return the convolution encoder to zero state. The PLCP preamble may play a role to allow the receiver to prepare for syncing and antenna diversity before the PSDU is transmitted. The data field may include padding bits to the PSDU, a service field including a bit sequence to initialize the scrambler, and a coded sequence in which a bit sequence added with tail bits has been encoded. In this case, as the encoding scheme, one of BCC (Binary Convolutional Coding) encoding or LDPC (Low Density Parity Check) encoding may be selected depending on the encoding scheme supported by the STA receiving the PPDU. The PLCP header may include a field containing information on the PPDU (PLCP Protocol Data Unit) to be transmitted.

The PLCP sub-layer 210 adds the above-described fields to the PSDU to generate the PPDU (PLCP Protocol Data Unit) and transmits the same to a receiving station via the PMD sub-layer 200, and the receiving station receives the PPDU and obtains information necessary for data restoration from the PLCP preamble and PLCP header to thus restore the same.

Figure 3:
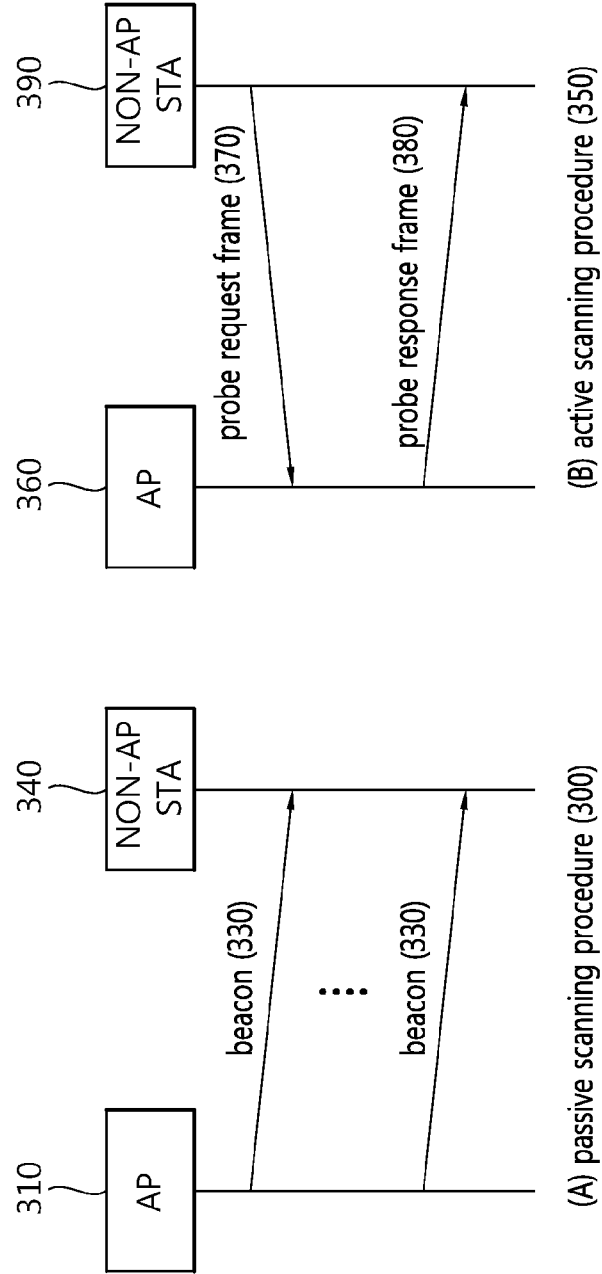
FIG. 3 is a conceptual diagram illustrating a scanning method in the wireless LAN.

FIG. 3 is a concept view illustrating a scanning method in a WLAN.

Referring to FIG. 3, the scanning method may be divided into passive scanning 300 and active scanning 350.

Referring to FIG. 3(A), the passive scanning 300 may be performed by a beacon frame 330 that is periodically broadcast from the AP 300. The AP 300 in the WLAN broadcasts the beacon frame 330 to the non-AP STA 340 at a particular period (e.g., per 100 msec). The beacon frame 330 may contain information on the current network. The non-AP STA 340 may perform scanning on the channel with the AP 310 to perform the authentication/association process by obtaining the network information from the beacon frame 330 periodically broadcast.

The passive scanning method 300 only receives the beacon frame 330 transmitted from the AP 310 without the need for the non-AP STA 340 to transmit a frame. Accordingly, the passive scanning 300 is advantageous of a reduction in the overall overhead that is created upon data transmission/reception over the network. However, since the scanning is obliged to be passively performed in proportion to the period of the beacon frame 330, the time taken to perform scanning may be increased. The details of the beacon frame are set forth in IEEE Draft P802.11-REVmb™/D12, November 2011 'IEEE Standard for Information Technology Telecommunications and information exchange between systems—Local and metropolitan area networks—Specific requirements Part 11: Wireless LAN Medium Access Control (MAC) and Physical Layer (PHY) Specifications (hereinafter, IEEE 802.11)' 8.3.3.2 beacon frame disclosed on November, 2011. IEEE 802.11ai may additionally use other format of a beacon frame, and such beacon frame may be referred to as a FILS (fast initial link setup) beacon frame. Further, the measurement pilot frame is a frame containing only some information of the beacon frame, and the measurement pilot frame may be used in the scanning procedure. The measurement pilot frame is set forth in IEEE 802.11 8.5.8.3 measurement pilot format.

Further, a fast initial link setup (FILS) discovery frame may be defined. The FILS discovery frame as a frame transmitted during a transmission cycle of the beacon frame at each AP may be a frame transmitted at a shorter cycle than the beacon frame. That is, the FILS discovery frame is a frame transmitted at a cycle having a smaller value than the transmission cycle. The FILS discovery frame may include identifier information (SSID and BSSID) of the AP that transmits the discovery frame. The FILS discovery frame is transmitted before the beacon frame is transmitted to the STA to allow the STA to discover that the AP exists in the corresponding channel in advance. An interval of transmitting the FILS discovery frame in one AP is referred to as an FILS discovery frame transmission interval. Some of the information included in the beacon frame is included in the FILS discovery frame, which may be transmitted. Some of the information included in the beacon frame is included in the FILS discovery frame, which may be transmitted. The FILS discovery frame may include even information on a transmission time of the beacon frame of a neighboring AP.

Referring to FIG. 3(B), the active scanning 350 refers to a method in which the non-AP STA 390 leads scanning by transmitting a probe request frame 370 to the AP 360.

After receiving the probe request frame 370 from the non-AP STA 390, the AP 360 may wait a random time to prevent frame collision, and the AP 360 then includes network information in a frame response frame 380, then sending the same to the non-AP STA 390. The non-AP STA 390 may obtain the network information based on the received probe response frame 380 to stop the scanning process.

The active scanning 350 allows the non-AP STA 390 to lead the scanning process, and the active scanning 350 has the advantage of a short scanning time. However, the non-AP STA 390 should transmit the probe request frame 37, resulting in an increase in the network overhead for frame transmission and reception. The probe request frame 370 is set forth in IEEE 802.11 Ch. 8.3.3.9, and the probe response frame 380 is set forth in IEEE 802.11 Ch. 8.3.3.10.

After the scanning is done, the AP and the STA may conduct an authentication and association procedure.

Figure 4:
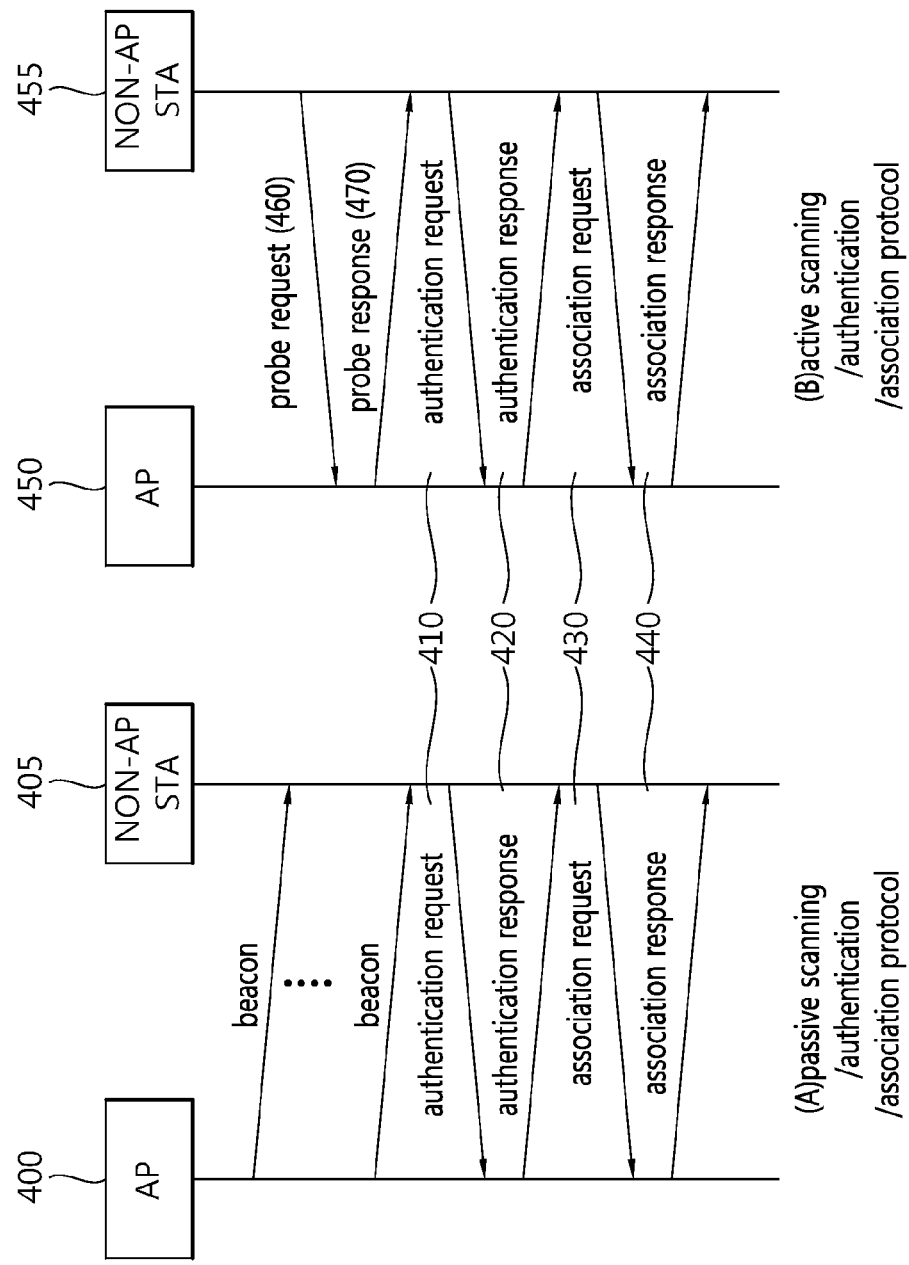
FIG. 4 is a conceptual diagram illustrating an authentication and association process after scanning of an AP and an STA.

FIG. 4 is a concept view illustrating an authentication and association process after scanning between an AP and an STA.

Referring to FIG. 4, after passive/active scanning, the authentication and association may be conducted with one of the scanned APs.

The authentication and association process may be carried out by way of, e.g., 2-way handshaking. FIG. 4(A) is a concept view illustrating an authentication and association process after passive scanning, and FIG. 4(B) is a concept view illustrating an authentication and association after active scanning.

The authentication and association process may be equally performed by exchanging an authentication request frame 410/authentication response frame 420 and an association request frame 430/association response frame 440 between the AP 400 or 450 and the non-AP STA 405 or 455 regardless of which one of the active scanning method and the passive scanning method has been used.

The authentication process may be conducted by transmitting the authentication request frame 410 from the non-AP STA 405 or 455 to the AP 400 or 450. In response to the authentication request frame 410, the authentication response frame 420 may be transmitted from the AP 400 or 450 to the non-AP STA 405 or 455. The authentication frame format is set forth in IEEE 802.11 Ch. 8.3.3.11.

The association process may be conducted by transmitting the association request frame 430 from the non-AP STA 405 or 455 to the AP 400 or 405. In response to the association request frame 430, the association response frame 440 may be transmitted from the AP 405 or 455 to the non-AP STA 400 or 450. The transmitted association request frame 430 contains information on the capability of the non-AP STA 405 or 455. Based on the information on the capability of the non-AP STA 405 or 455, the AP 400 or 350 may determine whether the non-AP STA 405 or 355 may be supported. In case such support is possible, the AP 300 or 450 may include in the association response frame 440 whether to accept the association request frame 440 and a reason therefore, and its supportable capability information, and the AP 300 or 450 may send the same to the non-AP STA 405 or 455. The association frame format is set forth in IEEE 802.11 Chs. 8.3.3.5/8.3.3.6.

After the association step is done, normal data transmission and reception is carried out. The association, unless done, is re-conducted based on the reason for which the association is not performed, or association with other AP may be performed.

Figure 5:
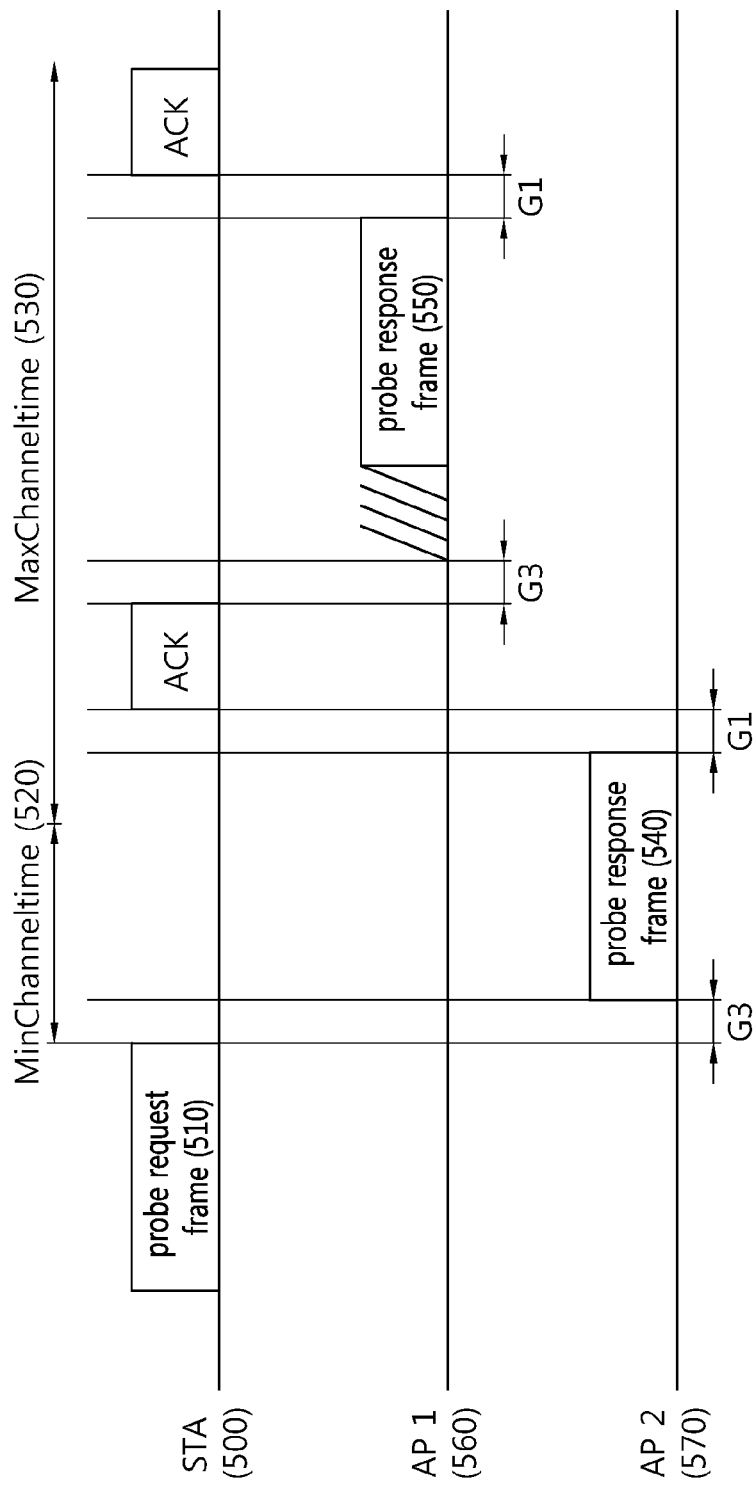
FIG. 5 is a conceptual diagram of an active scanning procedure.

FIG. 5 is a concept view illustrating an active scanning procedure.

Referring to FIG. 5, the active scanning procedure may be performed in the following steps.

(1) It is determined whether the STA 500 is ready to perform the scanning procedure.

The STA 500 may wait, e.g., until the probe delay time expires or particular signaling information (for example, PHY-RXSTART.indication primitive) is received to perform active scanning.

The probe delay time is a delay that occurs before the STA 500 sends a probe request frame 510 when performing active scanning. PHY-RXSTART.indication primitive is a signal that is transmitted from the physical (PHY) layer to the local MAC (medium access control) layer. PHY-RXSTART.indication primitive may signal information indicating that the PLCP (physical layer convergence protocol) has received a PPDU (PLCP protocol data unit) including a valid PLCP header to the MAC layer.

(2) Basic access is performed.

In the 802.11 MAC layer, a number of STAs may share a radio medium using a distributed coordination function (DCF) that is a contention-based function. The DCF may prevent collision between STAs through a back-off scheme using the carrier sense multiple access/collision avoidance (CSMA/CA) as its access protocol. The STA 500 may transmit the probe request frame 510 to the APs 560 and 570 using a basic access method.

(3) Information for specifying the APs 560 and 570 included in MLME-SCAN.request primitive (for example, SSID (service set identification) and BSSID (basic service set identification) information) may be included in the probe request frame 510 and may be transmitted.

The BSSID may have a value corresponding to the MAC address of the AP as an indicator to specify the AP. The SSID (service set identification) is a network term for specifying an AP, which may be read by a person who operates the STA. The BSSID and/or SSID may be used to specify an AP.

The STA 500 may specify an AP based on the information to specify the APs 560 and 570 included by MLME-SCAN.request primitive. The specified APs 560 and 570 may send the probe response frames 550 and 550 to the STA 500. The STA 500 may include the SSID and BSSID information in the probe request frame 510 and send the same, thereby unicasting, multicasting, or broadcasting the probe request frame 510. A method of unicasting, multicasting, or broadcasting the probe request frame 510 using the SSID and BSSID information is further described with reference to FIG. 5.

For example, in case an SSID list is included in MLME-SCAN.request primitive, the STA 500 may include the SSID list in the probe request frame 510 and transmit the same. The APs 560 and 570 may receive the probe request frame 510, determine the SSIDs included in the SSID list contained in the received probe request frame 510, and determine whether to send the probe response frames 550 and 550 to the STA 200.

(4) A probe timer is initialized as 0 and is then operated.

The probe timer may be used to check a minimum channel time (MinChanneltime, 520) and a maximum channel time (MaxChanneltime, 530). The minimum channel time 520 and the maximum channel time 530 may be used to control the active scanning operation of the STA 500.

The minimum channel time 520 may be used to perform the operation for varying the channel for conducting active scanning. For example, in case the STA 500 fails to receive the probe response frames 550 and 550 until the probe timer get to the minimum channel time 520, the STA 500 shifts scanning channels to perform scanning on other channel. In case the STA 500 receives the probe response frame 550 until the probe timer get to the minimum channel time 520, it may process the received probe response frames 540 and 550 after waiting until the probe timer get to the maximum channel time 530.

The STA 500 may detect PHY-CCA.indication primitive until the probe timer reaches the minimum channel time 520 and may determine whether other frame (for example, probe response frames 550 and 550) has been received by the STA 500 until before the minimum channel time 520.

PHY-CCA.indication primitive may transmit information on the state of the medium from the physical layer to the MAC layer. PHY-CCA.indication primitive may indicate the current state of the channel using channel state parameters such as "busy" when the channel is unavailable and "idle" when the channel is available. The STA 500 may determine that there are probe response frames 550 and 550 received by the STA 500 when PHY-CCA.indication is detected to be busy and may determine that there are no probe response frames 550 and 550 received by the STA 500 when PHY-CCA.indication is detected to be idle.

In case PHY-CCA.indication is detected to be idle, the STA 500 may set an NAV (net allocation vector) to 0, and the STA 500 may scan a next channel. In case PHY-CCA.indication is detected to be busy, the STA 500 may perform a process on the received probe response frames 550 and 550 after the probe timer reaches the maximum channel time 530. After the process on the received probe response frames 550 and 550 is done, the STA 500 may set the NAV (net allocation vector) to 0 and may then scan a next channel.

Hereinafter, in embodiments of the present invention, determining whether there are probe response frames 550 and 550 received by the STA 500 may also mean that the channel state is determined using PHY-CCA.indication primitive.

(5) In case all the channels included in the channel list (ChannelList) are scanned, the MLME may signal MLME-SCAN.confirm primitive. MLME-SCAN.confirm primitive may contain BSSDescriptionSet including all the information obtained in the scanning process.

In case the STA 500 uses the active scanning method, the STA 500 should perform monitoring to determine whether the parameter of PHY-CCA.indication is busy until the probe timer reaches the minimum channel time.

The specific information included in the above-described MLME-SCAN is as follows. In order for the STA to perform scanning, the MLME may receive MLME-SCAN.request primitive. MLME-SCAN.request primitive is a primitive created by the SME. MLME-SCAN.request primitive may be used to determine whether there is other BSS to which the STA is to be connected.

MLME-SCAN.request primitive may contain information specifically such as BSSType, BSSID, SSID, ScanType, ProbeDelay, ChannelList, MinChannelTime, MaxChannelTime, RequestInformation, SSID List, ChannelUsage, AccessNetworkType, HESSID, MeshID, VendorSpecificInfo. The details of MLME-SCAN.request primitive are set forth in IEEE Draft P802.11-REVmb™/D12, November 2011 'IEEE Standard for Information Technology Telecommunications and information exchange between systems—Local and metropolitan area networks—Specific requirements Part 11: Wireless LAN Medium Access Control (MAC) and Physical Layer (PHY) Specifications' 6.3.3.2 MLME-SCAN.request disclosed on November, 2011.

The following Table 1 briefly represents example information included in MLME-SCAN.request primitive.

TABLE 1

| name | description |
|---|---|
| BSSType | Determines whether infrastructure BSS, IBSS, MBSS (Mesh basic service set), or all, are included in the scan |
| BSSID | Identifies a specific or wildcard BSSID |
| SSID | Specifies the desired SSID or the wildcard SSID |
| ScanType | Indicates either active or passive scanning |
| ProbeDelay | Delay(in microseconds) to be used prior to transmitting a probe frame during active scanning |
| ChannelList | Specifies a list of channels that are examined when scanning for a BSS |
| MinChannelTime | The minimum time(in TU) to spend on each channel when scanning |
| MaxChannelTime | The maximum tine(in TU) to spend on each channel when scanning |
| RequirementInformation | This element is optionally present if dot11RadioMeasurementActivated is true and is placed in a Probe Request frame to request that the responding STA include the requested information in the Probe Response frame |
| SSID List | One or more SSID elements that are optionally present when dot11MgmtOptionSSIDListActivated is true |
| ChannelUsage | Specific request types for the ChannelUsage request |
| AccessNetworkType | Specifies a desired specific access network type or the wildcard access network type |
| HESSID | Specifies the desired specific HESSID network identifier or the wildcard network identifier. This field is present when dot11InterworkingSeviceActivated is true |
| Mesh ID | Only present if BSSType = MESH or BSSType = ANY_BSS. Specifies the desired Mesh ID or wildcard Mesh ID. |
| RequestParameters | The parameters define the responding STAs |
| ReportingOption | Indicates the result reporting mode |
| APConfigurationChangeCount | When a specific BSSID is indicated in the MLME-SCAN.request, the APConfigurationChangeCount associated with the stored configuration of the AP is optionally provided |
| VendorSpecificInfo | Information added according to each of vendors |

The request parameter included in MLME-SCAN.request primitive may be used to determine whether the responding STA is to transmit a probe response frame. The request parameter may contain information for requesting that other BSS's information be included in the probe response frame. Also, the request parameter may include a report request field, a delay reference field, and a maximum delay limit field.

The report request field contains information to request that other BSS's information be included in the probe response frame, the delay reference field contains information on the delay type applied as a response to the probe request frame, and the maximum delay limit field may contain the maximum access delay information on the delay type indicated by the delay reference field.

Besides, the request parameter may include a minimum data rate field and/or a received signal strength limit field. The minimum data rate field contains information on the lowest overall data rate in transmitting an MSDU or A-MSDU. The received signal strength limit field may further contain information on the limit value of the signal necessary for a recipient of the probe request frame to respond.

FIG. 6 is a conceptual diagram illustrating a method for transmitting a probe request frame.

In FIG. 6, a method in which the STA broadcasts, multicasts, and unicasts the probe request frame is disclosed.

FIG. 6(A) illustrates a method in which the STA 600 broadcasts the probe request frame 610.

The STA 600 encapsulates a widecard SSID and a widecard BSSID in the probe request frame 610 to broadcast the probe request frame 610.

The wildcard SSID and the wildcard BSSID may be used as identifiers for indicating all of APs 606-1, 606-2, 606-3, 606-4, and 606-6 included in a transmission range of the STA 600.

The STA 600 transmits the probe request frame 610 including the wildcard SSID and the wildcard BSSID, the APs 606-1, 606-2, 606-3, 606-4, and 606-6 that receive the probe request frame 610 transmitted by the STA 600 may transmit a probe response frame to the STA 600 as a response to the received probe request frame.

When the response frame is transmitted to the STA 600 as the response to the probe request frame 610 received by the APs 606-1, 606-2, 606-3, 606-4, and 606-6 that receives the broadcasted probe request frame 610 for a predetermined time, a problem that the STA 600 should receive and process too many probe response frames at once may occur.

FIG. 6(B) illustrates a method in which the STA 620 UNIbroadcasts the probe request frame 630.

Referring to FIG. 6(B), when the STA 620 unicasts the probe request frame 630, the STA 620 may transmit the probe request frame 630 including specific SSID/BSSID information of the AP. Only an AP 626 corresponding to an SSID/BSSID specified by the STA 620 among APs that receive the probe request frame 630 may transmit the probe response frame to the STA 620.

FIG. 6(C) illustrates a method in which the STA 640 multicasts the probe request frame 660.

Referring to FIG. 6(C), the STA 640 may transmit the probe request frame 660 including an SSID list and the wildcard BSSID. APs 660-1 and 660-2 corresponding to an SSID included in the SSID list included in the probe request frame among AP that receive the probe request frame 660 ID specified by the STA 660 among APs that receive the probe request frame 630 may transmit the probe response frame to the STA 640.

In performing the scanning procedure, the STA senses a channel during a probe delay interval whether the frame received through the channel exists.

The active scanning procedure in the related art will be described below. The STA may receive MLME-SCAN-request primitive to instruct active scanning generated in an MLME. The STA may determine a (unicast, multicast, or broadcast) method for transmitting the probe request frame based on the MLME-SCAN-request primitive and further, determine the BSSID and the SSID to be included in the probe request frame.

The STA may determine whether the probe delay time is terminated and a valid frame is received by a PHY layer of the STA. The probe delay may be used as a channel discovery interval which the STA performing the active scanning uses before transmitting the probe request frame. For example, when the valid frame is received by the PHY layer, the PHY layer of the STA generates specific primitive (for example, PHYRxStart.indication primitive) to transmit the generated primitive to an MAC layer. When the probe delay time is terminated and the valid frame is received by the PHY layer of the STA, the STA may perform channel access in order to transmit the probe request frame to the channel. When the STA succeeds in the channel access, the STA may transmit the probe request frame to the channel.

The STA may transmit the probe request frame and set a probe timer. The STA may measure a channel status until the probe timer reaches a minimum channel time. When the channel status is not busy according to a measurement result of the channel status of the STA, the STA may set NAV to 0 and scan another channel. When the channel status is busy according to the measurement result of the channel status of the STA, the STA may receive the probe response frame from the channel until the probe timer reaches a maximum channel time. The STA may process all of probe response frames which are received when the probe timer reaches the maximum channel time. Whether the channel status sensed by the STA is busy may be determined based on PHY-CCA.indication primitive generated by the PHY layer of the STA.

Herein, a wireless access method used in 802.11 will be disclosed.

A plurality of STAs may share a radio medium based on the distributed coordination function (DCF) performed by the MAC layer. The DCF is based on carrier sensing multiple access with collision avoidance (CSMA/CA). The plurality of STAs may share the medium based on request to send (RTS)/clear to send (CTS) selectively performed by the MAC layer. The DCF may be configured so as for the plurality of STAs to share the radio medium based on the following operation in detail.

Figure 7:
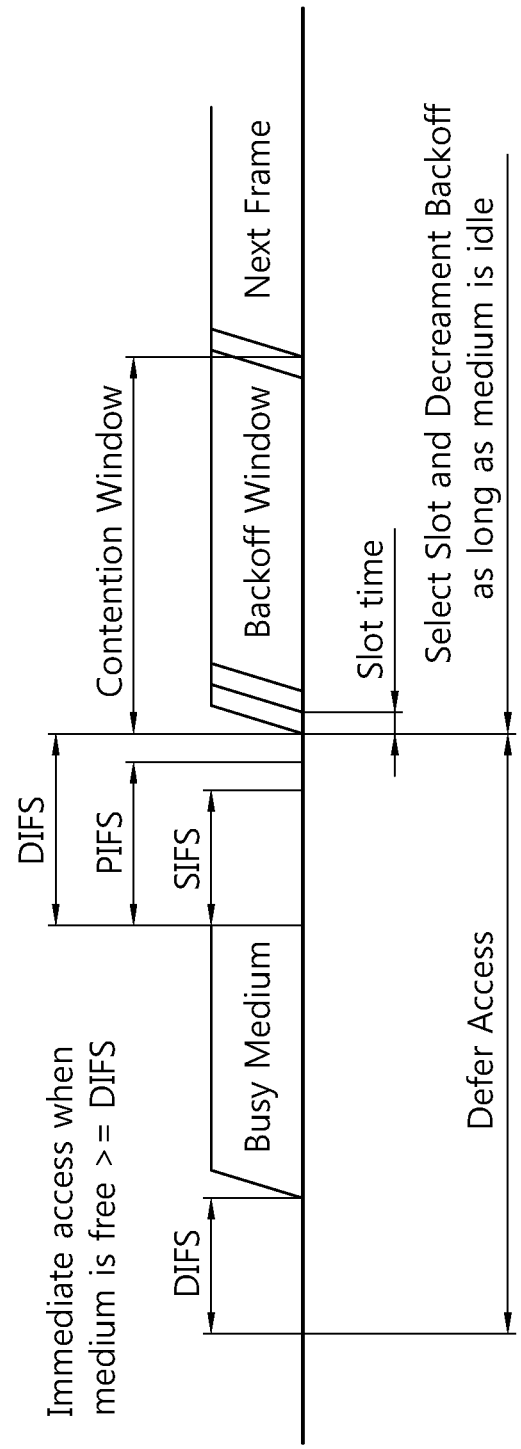
FIG. 7 is a conceptual diagram illustrating a channel access method of the STA based on a distributed coordination function (DCF).

FIG. 7 is a concept view illustrating a channel access of a STA based on a DCF access process.

Generally, In the method for the channel access of the STA based on a DCF, the STA may transmit an immediate MPDU (MAC Protocol Data Unit) if a medium is not used for a DCF interframe space (DIFS) period or more (i.e., if the channel is idle during DIFS). In case the medium is determined to be in use by a carrier sensing mechanism by the STA, the STA may determine the size of a CW (Contention Window) by a random backoff algorithm and may perform a backoff procedure. In order to perform the backoff procedure, the STA sets up the CW and selects some time slot. The selected time slot is called a backoff time. Among a plurality of STAs, a STA having the relatively short backoff time may access the medium faster than a STA having the relatively long backoff time. The other STAs may stop the remaining backoff time and wait until transmitting a frame of an accessed STA is completed. After the transmission of frame of the accessed STA is complete, the other STAs conduct contention over the remaining backoff time to obtain the medium.

In other words, in case the STA gains access to a channel using the DCF, the STA may detect the channel state for a predetermined time. Specifically, the STA, in case the channel remains idle during DIFS, attempts transmission after a random backoff time. Such DCF-based transmission scheme plays a role to avoid a plurality of STAs from a simultaneous transmission of frames, thus preventing collision.

The random backoff time is a time period during which the STA waits before a frame is transmitted after waiting a predetermined time (for example, DIFS), and the random backoff time may be defined as in the following equation 1:

$$\text{Backoff time} = \text{Random}(\ ) \times \text{SlotTime} \qquad \text{<Equation 1>}$$

Random( )=an integer between 0 and CW

CW is an integer between CWmin and CWmax

In short, the STA may determine a CW based on the CWmin which is the minimum CW time, and the CWmax which is the maximum CW time. The STA may determine the backofftime based on the determined CW.

Figure 8:
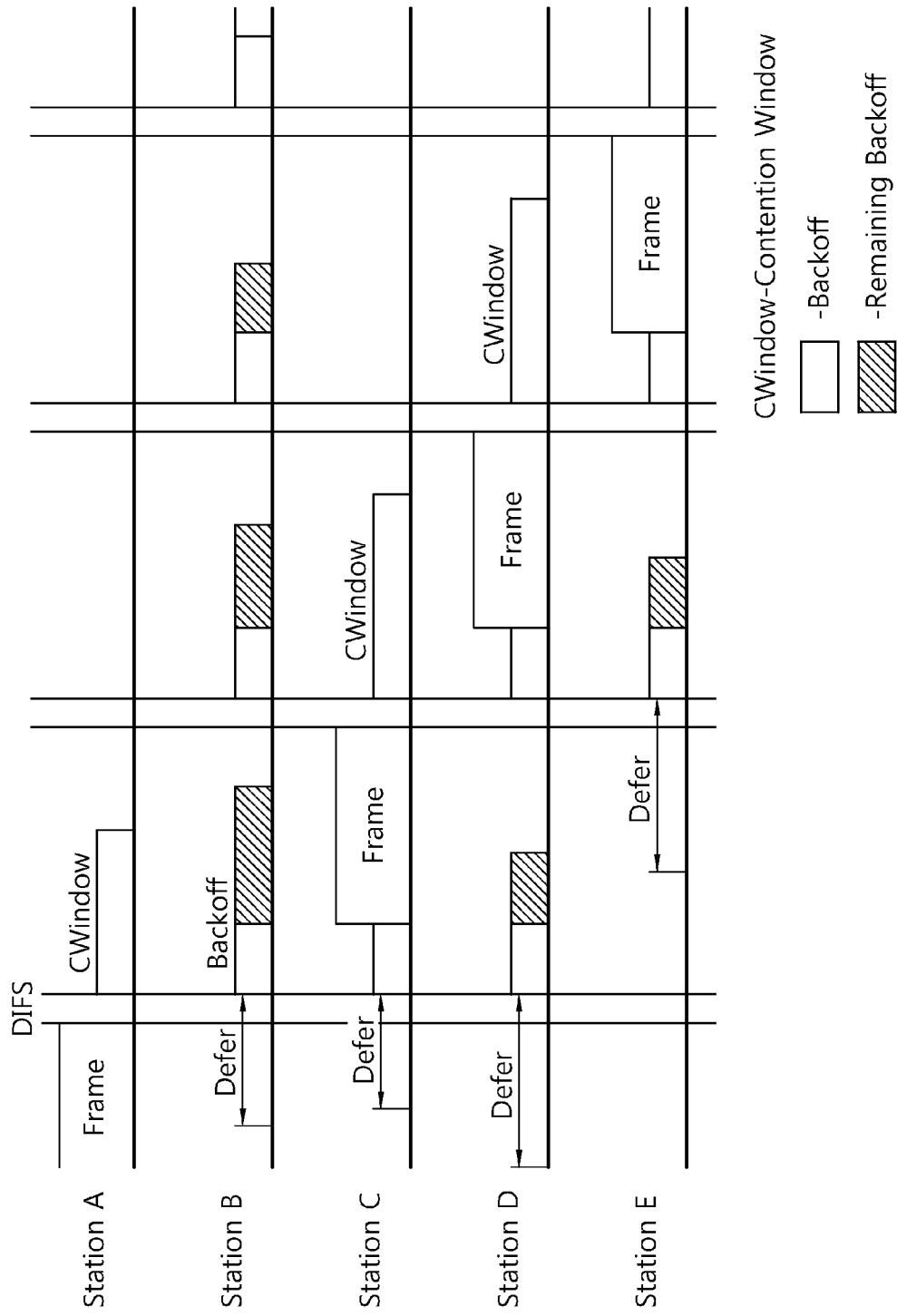
FIG. 8 is a conceptual diagram illustrating a back-off procedure of a plurality of STAs.

FIG. 8 is a concept view illustrating a backoff procedure of a plurality of STAs.

Referring to FIG. 8, a backoff slot may occur after a medium is determined to be idle for a DIFS period. If no activity of the medium is detected after DIFS, the STA may reduce the backoff time based on aSlotTime. In case the medium is determined to be in use for the backoff slot, the STA might not reduce the backoff time. The frame transmission of the STA may be performed whenever a set backoff timer is 0.

Further, in the DCF transmission scheme an RTS/CTS access mode may be used. When the RTS/CTS access mode is used, control frames (RTS, CTS) are exchanged before a data frame is transmitted to pre-occupy a channel. Such scheme may reduce channel waste by replacing a collision that may occur upon transmission of a data frame with a collision by a relatively short control frame.

As another method for sharing a radio medium by a plurality of STAs, the MAC layer can use a PCF (Point Coordination Function). The above-described DCF is based on the CSMA/CA scheme and is thus not able to guarantee real-time transmission of data transmitted between an STA and an AP. In contrast, the PCF which is a transmission method based on a non-contention may be used as a method to guarantee QoS (Quality Of Service) upon real-time data transmission. The PCF, also known as a non-contentious transmission service, may be used alternately with a DCF-type contention-based service, rather than exclusively using the entire medium transmission period. In the PCF, a point coordinator implemented in the AP of the BSS may control the right for each STA to be able to occupy the medium using a polling scheme. The PCF may be given a priority over the DCF by setting the PIFS, which is an IFS (Inter-Frame Space) in the PCF, to be smaller than the DIFS, which is an IFS of the DCF. The IFS denotes an interval between frames, and the IFS may be used to set a priority in which an STA accesses the medium. The IFS may be specifically defined as follows.

Figure 9:
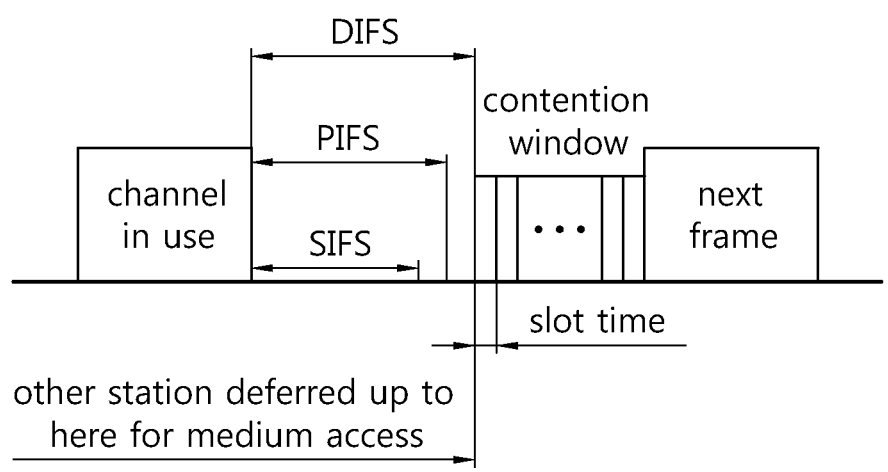
FIG. 9 is a conceptual diagram illustrating an inter-frame space.

FIG. 9 is a concept view illustrating a interframe space (IFS).

Referring to FIG. 9, the interval between two frames may be referred to as an IFS. An STA may determine whether a channel is being used for a time period of the IFS as previously defined, using a carrier sensing scheme. The MAC layer using the DCF defines various IFSs. The priority of an STA occupying a radio medium may be determined by an IFS. Inter-frame intervals depending on types of IFSs are as follow:

(1) SIFS (Short Inter Frame Symbol): used upon RTS/CTS, ACK frame transmission. Highest priority (2) PIFS (PCF IFS): used upon PCF frame transmission (3) DIFS (DCF FIS): used upon DCF frame transmission (4) EIFS (Extended IFS): used only when frame transmission error occurs. Not fixed interval In case the DCF is used only for a plurality of STAs to share a radio medium at the MAC layer, various problems may arise. For example, when the DCF is used, if a plurality of STAs simultaneously conduct initial access to an AP, collision frequently occurs between the plurality of STAs. Further, the DCF lacks the concept of transmission priority and is not thus able to guarantee QoS (Quality Of Service) for traffic data transmitted from an STA. To address such issues, 802.11e defines a new coordination function, HCF (Hybrid Coordination Function), to enhance the channel access capability of the existing DCF and HCF. The HCF defines two channel access schemes, HCCA (HCF Controlled Channel Access) and EDCA (Enhanced Distributed Channel Access), similar to those defined in 802.11 MAC.

The EDCA and HCCA defines traffic categories that are transmission priorities, and the EDCA and HCCA may determine priorities at which channel access is conducted. In other words, the EDCA and HCCA may determine channel access priorities depending on types of traffic data by mutually defining a CW and an IFS according to the category of traffic data transmitted from an STA.

For example, in case traffic data is an email, the data may be allocated to a low priority class. As another example, in case traffic data is a voice communication through a wireless LAN, channel access may be conducted, with the traffic data allocated to a high priority class because the data for the voice communication is data needed for a real time data transmission.

Upon use of the EDCA, traffic data with a higher priority would have relatively more chance to be transmitted as compared with traffic data with a lower priority. Further, an STA having higher-priority traffic may have a shorter average wait time than an STA having lower-priority traffic before transmitting packets. A transmission priority in the EDCA may be implemented by allocating a shorter CW to higher-priority traffic rather than lower-priority traffic while assigning an AIFS (Arbitration inter-Frame Space) that is shorter than the IFS that is a frame interval defined in the DCF. Further, the EDCA enables an STA to access a channel without contention during a period that is referred to as a TXOP (Transmit Opportunity). An STA may transmit as many packets as possible during a predetermined TXOP period within a range not exceeding the maximum period of the TXOP. If one frame is too long to be transmitted during one TXOP, the frame may be cut into smaller frames that may be then transmitted. Use of the TXOP may mitigate the situation that an STA with a low transmission rate excessively occupies a channel, which is a problem of the existing 802.11 DCF MAC.

Figure 10:
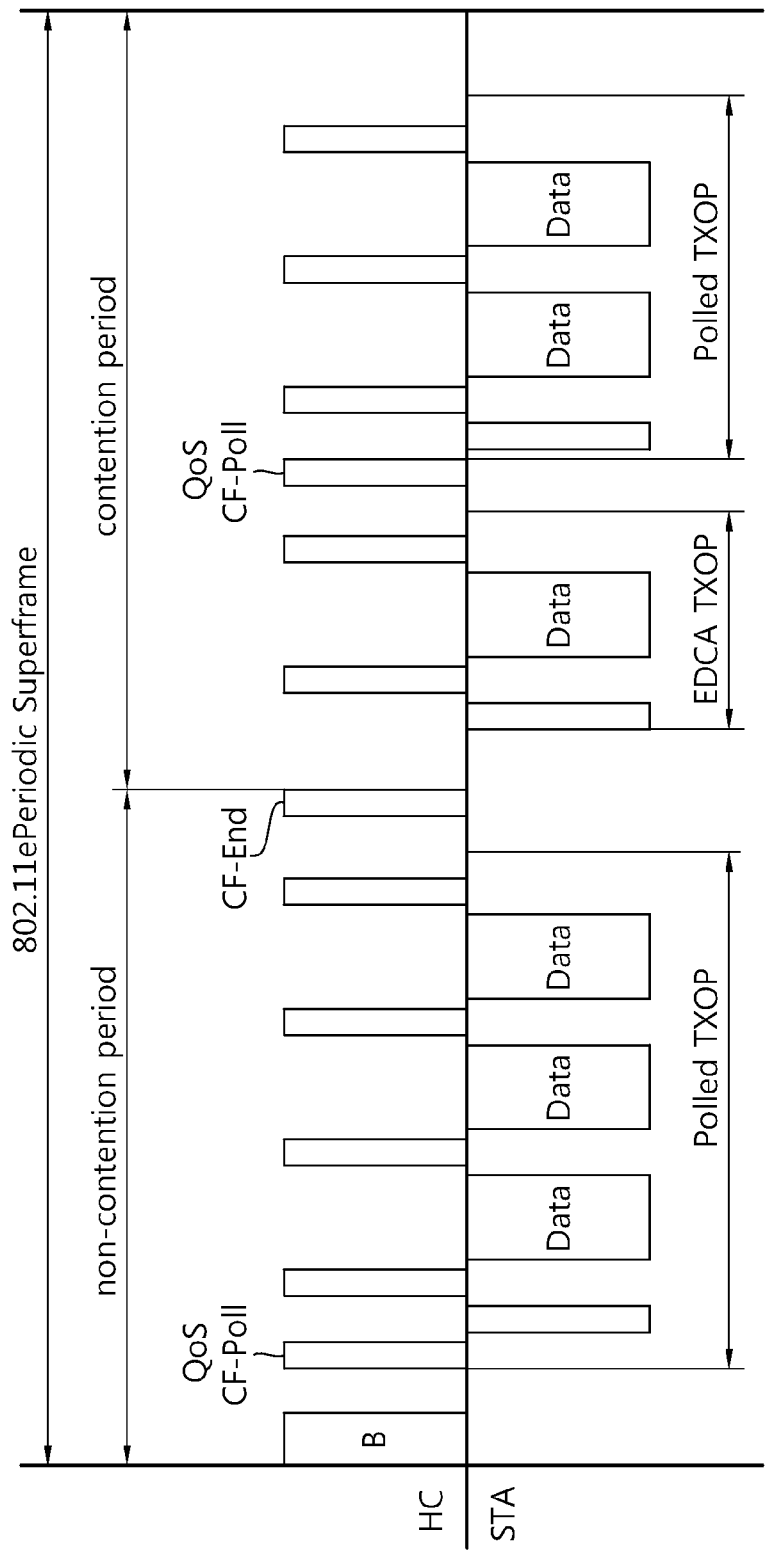
FIG. 10 is a conceptual diagram illustrating a method for acquiring a transmit opportunity (TXOP) of the STA.

FIG. 10 is a concept view illustrating a method of obtaining a TXOP by an STA.

Referring to FIG. 10, an STA attending QoS transmission may use two channel access schemes such as EDCA and HCCA to obtain a TXOP by which the STA may transmit traffic for a predetermined traffic. The TXOP may be obtained by succeeding in an EDCA contention or by receiving a QoS CF-Poll frame from an access point. The TXOP obtained by succeeding in an EDCA contention is called an EDCA TXOP, and a TXOP obtained by receiving a QoS CF-Poll frame from an AP is called a Polled TXOP. As such, use of the concept "TXOP" enables an STA to be given a predetermined time during which the STA may transmit a frame or enables the transmission time of the STA to be forcedly constrained. The transmission start time and maximum transmission time of a TXOP may be determined by an AP. The EDCA TXOP may be notified to an STA by a beacon frame, and the Polled TXOP may be notified to an STA by a QoS CF-Poll frame.

The EDCA and HCCA which are channel access schemes defined in the HCF are hereinafter described in greater detail.

(1) EDCA

In the EDCA scheme, channel access may be conducted with a plurality of user priorities (for example, 8 user priorities) defined for traffic data. For priority-based QoS data frame transmission, the EDCA defines four ACs (Access Categories: AC_BK, AC_BE, AC_VI, and AC_VO). The EDCA may, based on the ACs, map the traffic data arriving at the MAC layer with different user priorities as in the following <Table 2>.

Table 2 exemplifies the mapping between the user priorities and the ACs.

TABLE 2

| Priority | User Priority | AC(access category) |
|---|---|---|
| Low | 1 | AC_BK |
|  | 2 | AC_BK |
|  | 0 | AC_BE |
|  | 3 | AC_BE |
|  | 4 | AC_VI |
|  | 5 | AC_VI |
|  | 6 | AC_VO |
| High | 7 | AC_VO |

A transmission queue and access category or access class (AC) parameter may be defined for each AC. The differences in transmission priority between the ACs may be implemented based on the AC parameter values set to be different from each other. The AC parameters are access parameter information to determine the channel access method according to each of ACs. The EDCA may use AIFS[AC], CWmin[AC], and CWmax[AC] instead of DIFS, CWmin, and CWmax, respectively, which are parameters used in the DCF in the backoff procedure for transmitting the frames belonging to the AC. The parameters used in the backoff procedure for each AC may be carried over a beacon frame from an AP to each STA. As AIFS[AC] and CWmin[AC] decrease, a higher priority is given, and accordingly, the channel access delay shortens, thus allowing for use of more bands in a given traffic environment.

In case a collision occurs between the STAs while the STA transmits a frame, an EDCA backoff procedure of generating a new backoff counter is similar to the existing DCF backoff procedure, and differentiated backoff procedures for each AC may be performed based on different EDCA parameters. The EDCA parameters is becoming a critical means to differentiate channel access of various user priorities of traffic. A proper configuration of the EDCA parameter value including per-AC parameters may increase the transmission effect according to the priority of traffic while optimizing the network performance. Accordingly, an AP should conduct the overall management and adjustment function for the EDCA parameters to ensure that all of the STA attending the network may evenly access the medium.

Figure 11:
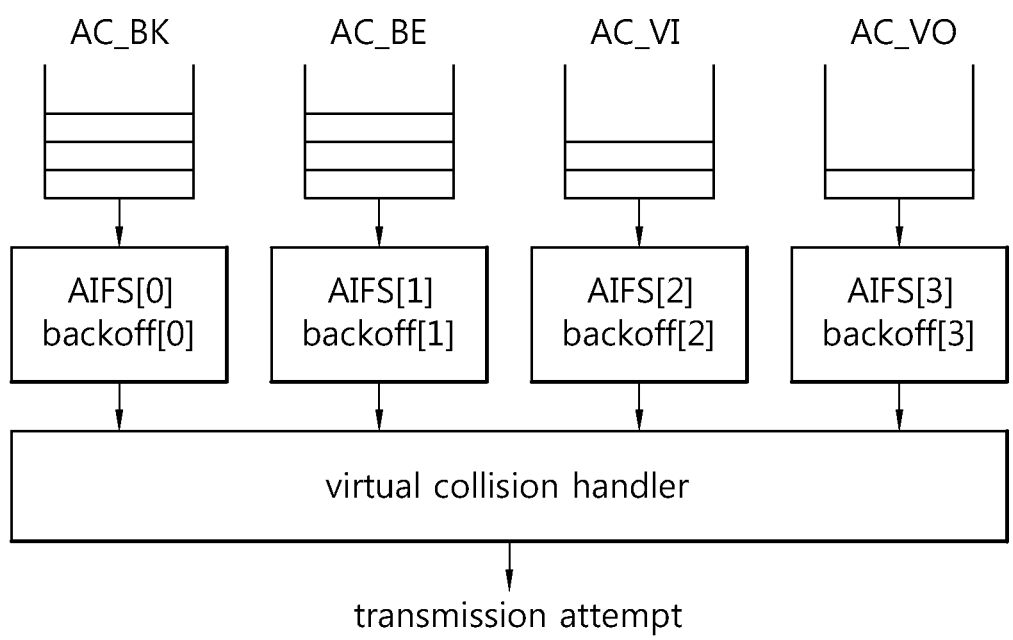
FIG. 11 is a conceptual diagram illustrating an enhanced distributed channel access (EDCA) channel reference model.

FIG. 11 is a concept view illustrating an EDCA channel reference model.

Referring to FIG. 11, the transmission queue for each of the four ACs defined in 802.11e MAC may play a role as an individual EDCA contention entity for radio medium access in one STA. One AC may retain an independent backoff counter with its own AIFS value. If there are one or more ACs that have simultaneously finished backoff, the collision between the ACs may be adjusted by a virtual collision handler. A frame is first transmitted to an AC having the highest priority, and the other ACs renew their backoff counters by increasing the contentious window values.

The start of a TXOP occurs upon accessing a channel according to the EDCA rules. If obtaining an EDCA TXOP when two or more frames stack in one AC, the EDCA MAC may attempt to transmit a number of frames. If an STA has already sent one frame and the STA may transmit a next frame in the same AC within the remaining TXOP time and receive an ACK thereto, the STA attempts transmission of the frame after an SIFS time interval. A TXOP constraint value may be transferred from the AP to the STA. In case the size of a data frame to be transmitted is in excess of the TXOP constraint value, the STA may fragment the frame into a number of smaller frames, and the STA may transmit the smaller frames within a range not exceeding the TXOP constraint value.

Figure 12:
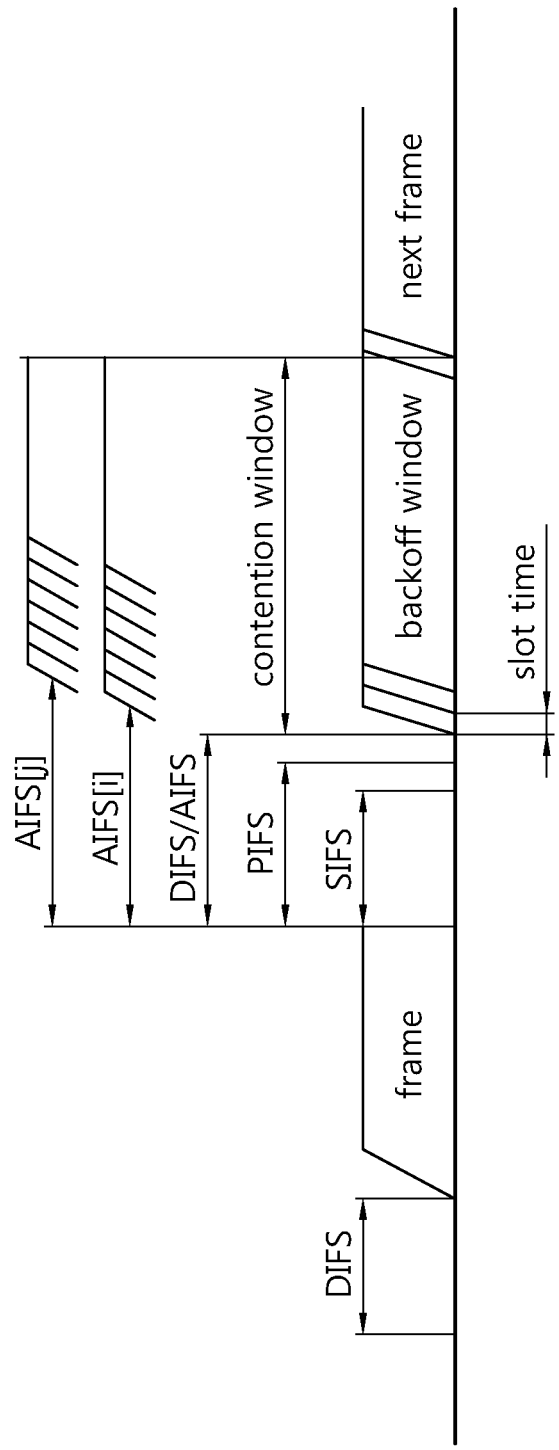
FIG. 12 is a conceptual diagram illustrating a back-off procedure of the EDCA.

FIG. 12 is a concept view illustrating a backoff procedure of an EDCA.

Referring to FIG. 12, each traffic data transmitted from an STA has a priority, and a backoff procedure may be conducted based on a contentious EDCA scheme. For example, the priorities respectively assigned to the traffics, as set forth above in Table 2, may be separated into eight, for example. As described above, one STA has different output queues depending on priorities, and each output queue is operated according to the EDCA rules. Each output queue may transmit traffic data using different AIFSs (Arbitration Interframe Spaces) according to each priority instead of the conventionally used DIFSs (DCF Interframe Spaces). Further, in case STAs are supposed to transmit traffics having different priorities at the same time, a traffic having a higher priority is transmitted earlier than the others, preventing collision in the terminal.

A backoff occurs under the following situations. A backoff is used when the frames transmitted from terminals cause collision and thus re-transmission is needed. To initiate a backoff, a terminal sets any backoff time in its backoff timer using Equation 2 below:

$$T_b[i] = \text{Random}(i) \times \text{SlotTime} \quad \text{<Equation 2>}$$

Here, Random(i) is a function that generates any integer between 0 and CW[i] using a uniform distribution. CW[i] is a contention window between the minimum contention window CWmin[i] and the maximum contention window CWmax[i], and i is a traffic priority. At every collision, a new contention window CWnew[i] is computed using the following Equation 3 including a previous window CWold[i]:

$$CW_{new}[i] = ((CW_{old}[i]+1) \times PF) - 1 \quad \text{<Equation 3>}$$

Here, PF is computed according to the procedure defined in the IEEE 802.11e standard. CWmin[i], AIFS[i], and PF value may be transmitted from the AP using a QoS parameter set element that is a management frame.

(2) HCCA

The HCCA protocol uses an HC (Hyper Coordinator) that is positioned in an AP for centralized management on radio medium access. Since the HC performs integrated and centralized management on the radio medium, contention over radio medium access between STAs may be reduced, and exchange between data frames may be left in a short transmission delay time (SIFS), thus increasing network efficiency.

The HC controls transmission delay and scheduling by defining, in a parameter, a QoS characteristic for a particular traffic required by an application service to support QoS. Prior to the transmission of the parameterized QoS traffic, the HC establishes a virtual connection that is referred to as a traffic stream. The traffic stream may correspond to each of uplink from STA to AP, downlink from AP to STA, or direct link from STA to STA. In order to configure a traffic stream between an AP and an STA, QoS demand parameters such as delay time and traffic characteristics such as frame size and average transmission speed are exchanged through a mutual negotiation process.

In case the HC transmits a QoS CF-Poll frame to an STA, a TXOP limit value that is a service provision time allowed to the STA is included in the QoS control field. In other words, the HC controls allocation of a medium access time using the TXOP. The TXOP limit value is determined by a TSPEC. The TSPEC is requested by a station, and an AP determines whether to accept or decline the request for the TSPEC depending on network circumstances.

Once a traffic stream is configured, the HC provides contracted QoS by allocating a radio band required for the configured traffic stream between the AP and the STA. At a non-contention period of the HCCA, the HC has a right to control the medium, and if required, even at a contention period, the HC obtains a right to control the medium by transmitting a QoS CF-Poll frame after as long a delay time as the PIFS.

Figure 13:
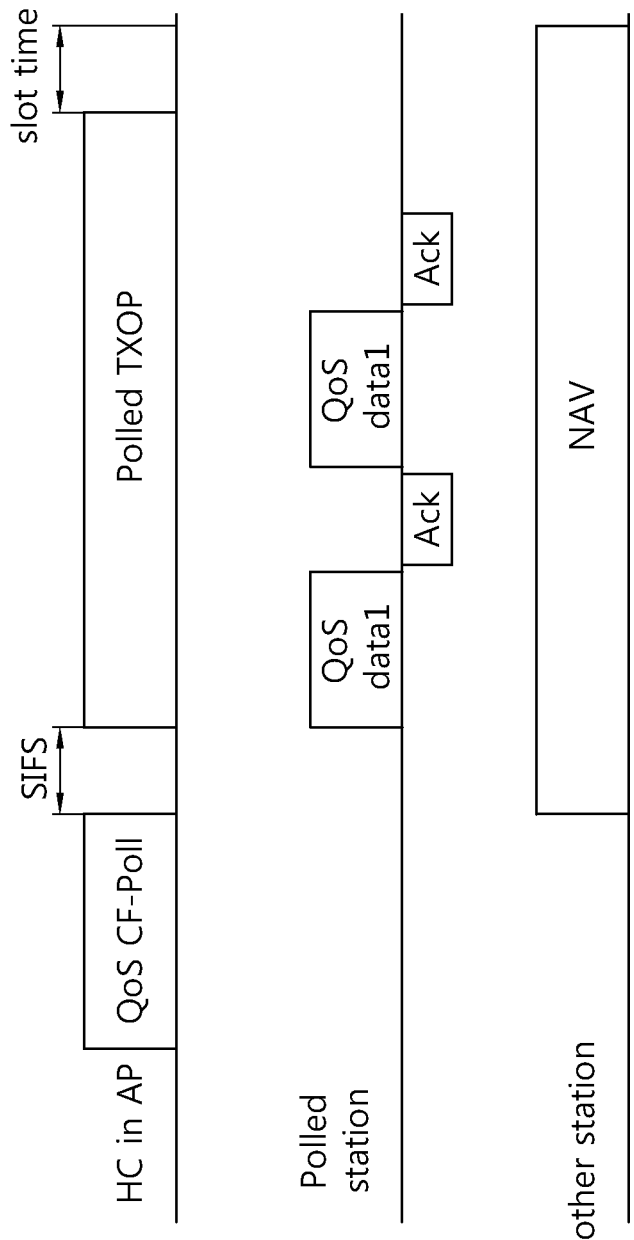
FIG. 13 is a conceptual diagram illustrating a polled TXOP timing.

FIG. 13 is a conceptual diagram illustrating a polled TXOP timing.

Referring to FIG. 13, a polled STA that possesses a TXOP receives a QoS CF poll frame to transmit multiple frames with an authority of the channel access for a time as much as a TXOP limit value designated in the QoS CF poll frame. In this case, other STAs configure its own network allocation vector (NAV) by collecting a TXOP time and a predetermined time after receiving the QoS CF poll frame even though not corresponding thereto and do not contend with each other for the channel access during the corresponding time.

Consequently, an HC needs to schedule appropriate transmission of the QoS CF poll frame in order to meet contracted QoS requirements. In the case of the radio medium, since a condition of the channel depending on the time or position is diversified, making an efficient scheduling algorithm becomes a primary element in supporting the QoS. An excellent scheduling algorithm permits more traffic streams while not breaching a QoS contract to improve the performance of the wireless network.

After the STA receives the beacon frame or the probe response frame, multiple STAs may attempt to simultaneously access the AP. In this case, there may be a higher probability that the multiple STAs will collide with each other by simultaneously performing the channel access. In an initial access procedure of the STA in the related art, the STA transmits an association request frame by using access parameters (e.g., CWmin, CWmax, and AIFSN) corresponding to AC_VO at the time of transmitting the association request frame. In this case, there a higher probability that the multiple STAs will simultaneously access the AP and in this case, the initial access procedure of the STA may be delayed.

In the embodiment of the present invention, a method for distributing a transmission timing of the association request frame at the time of transmitting association request frames of multiple terminals to the AP will be disclosed. Hereinafter, the method is disclosed based on the association request frame in the embodiment for easy description, but the method may be applied even to another management frame (e.g., an authentication request frame) and the embodiment is also included in the claims of the present invention.

Figure 14:
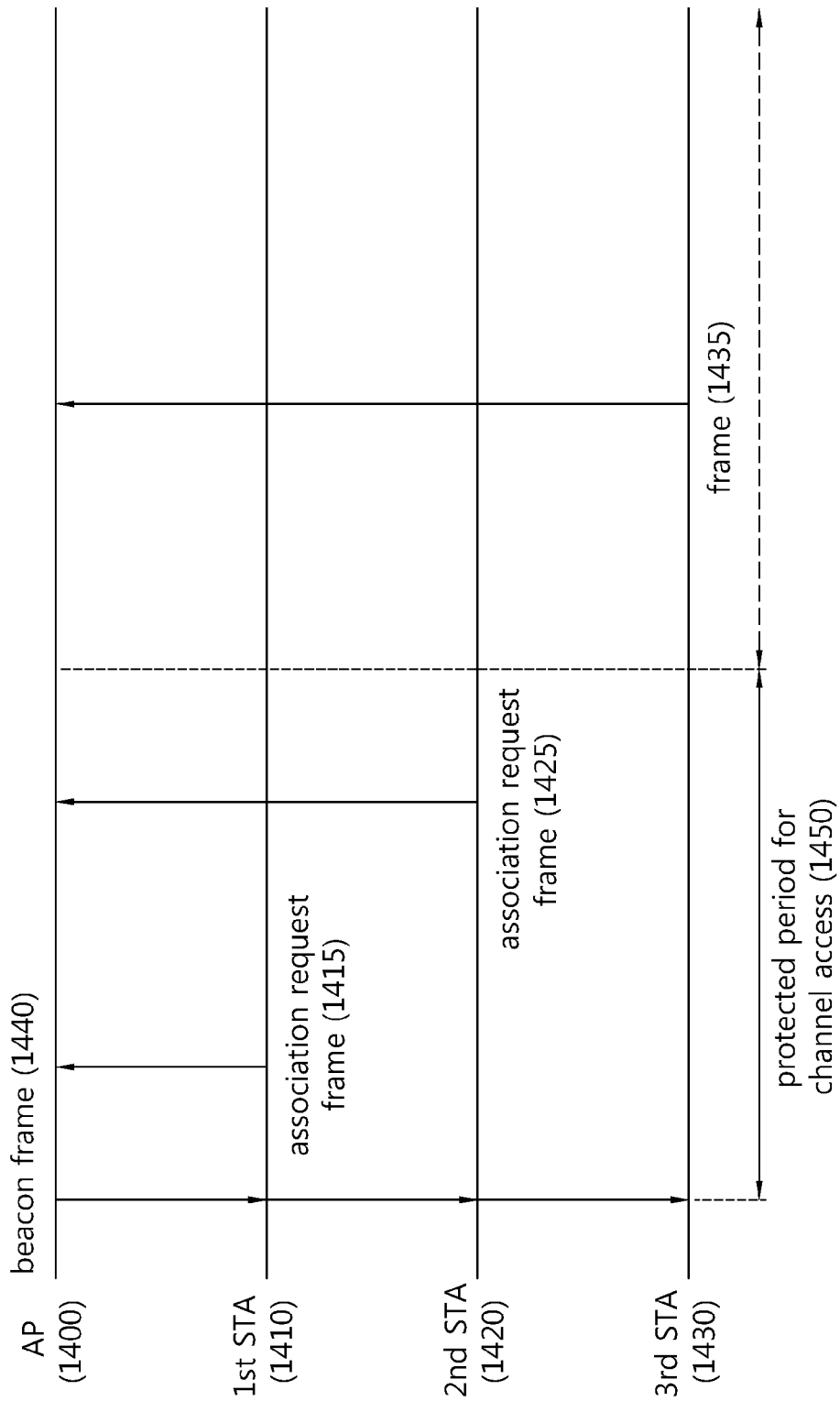
FIG. 14 is a conceptual diagram illustrating an initial link configuring method according to an embodiment of the present invention.

FIG. 14 is a conceptual diagram illustrating an initial link configuring method according to an embodiment of the present invention.

According to the embodiment of the present invention, the STA may receive the beacon frame or the FILS discovery frame at the time of performing passive scanning. The beacon frame or the FILS discovery frame may be received by multiple STA that exists around the AP. In this case, the timing when the multiple STAs that receive the beacon frame or the FILS discovery frame performs the initial link setup (alternatively, the initial channel access) in order to associate with the AP may be overlapped. Accordingly, when the multiple STAs perform the initial link setup, the STA may collide with each other.

In the embodiment of the present invention, in order to solve the problem, a method that permits only transmission of a terminal that attempts the initial access during a predetermined time interval by defining a predetermined time to reduce a possibility that the STAs will collide with each other at the time of performing the initial link setup will be disclosed. Hereinafter, the predetermined time interval will be defined and used as a term called a protected channel access interval in the embodiment of the present invention. The protected channel access interval may be used as a term called an initial protected link setup interval as another term.

In the protected channel access interval, frames (e.g., a data frame and another management frame) of already associated terminals are transmitted after the protected channel access interval to limit channel access of another STA that does not perform the initial link setup in the protected channel access interval. Information on the protected channel access interval may be transmitted to the STA through the beacon frame or the FILS discovery frame.

Referring to FIG. 14, the AP and two STAs (a first STA and a second STA) that set up the initial link setup around the AP and one STA (a third STA) which already associates with the AP through the initial link setup may exist already in the BSS. Two STAs that perform the initial link setup and one STA that already performs the initial link setup may receive the beacon frame or the FILS discovery frame transmitted by the AP. The information on the protected channel access interval may be included in the beacon frame and the FILS discovery frame. The first STA and the second STA may acquire the information on the protected channel access interval based on the beacon frame or the FILS discovery frame and transmit the management frames (e.g., the authentication request frame, the association request frame, and the like) for the initial link setup in the corresponding interval. The third STA may also acquire the information on the protected channel access interval based on the beacon frame or the FILS discovery frame. The third STA does not transmit the frame to the AP in the protected channel access interval, but may transmit the frame to the AP by performing the channel access in an interval other than the protected channel access interval. By using the method, the already associated STA does not occupy the channel when other STAs perform the initial link setup to reduce the collision which occurs at the time of performing the initial link setup. Accordingly, the initial channel access of the STA that performs the initial channel access may be rapidly performed.

Additionally, the initial channel access timing of the STA that performs the initial channel access in the protected channel access interval may be distributed. The embodiment will be additionally described below in the embodiment of the present invention.

Figure 15:
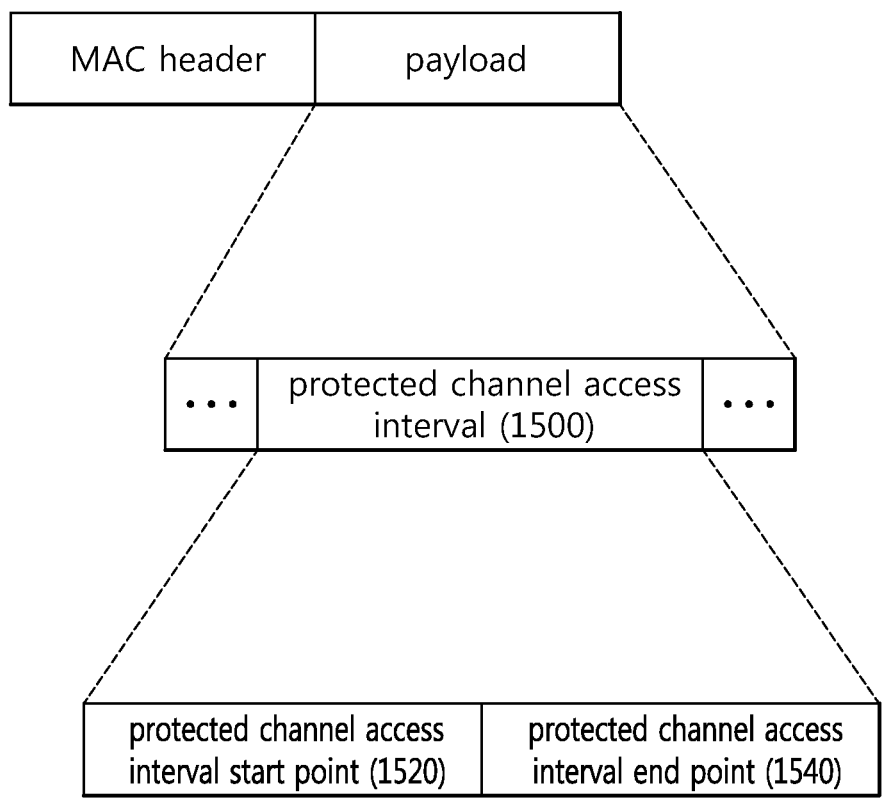
FIG. 15 is a conceptual diagram illustrating a frame including information on a channel access protection section according to an embodiment of the present invention.

FIG. 15 is a conceptual diagram illustrating a frame including information on a channel access protection section according to an embodiment of the present invention.

In FIG. 15, the frame including the information on the protected channel access interval may be the beacon frame or the FILS discovery frame.

The protected channel access interval may include information on an interval in which the terminal performing the initial link setup transmits the frames (e.g., the authentication request frame, the association request frame, and the like) for the initial link setup. For example, when the information on the protected channel access interval is set to 1, the set 1 may instruct the AP to permit only the transmission of the frame for performing the initial channel access in the protected channel access interval. On the contrary, when the information on the protected channel access interval is set to 0, the set 0 may instruct the AP to permit even transmission of another frame in addition to the frame for performing the initial channel access in the protected channel access interval.

A value for an interval may be included in the protected channel access interval specific to the information 1500 on the protected channel access interval. The STA may acquire information on an interval used for the initial link setup based on the information 1500 on the protected channel access interval. For example, information 1520 on a protected channel access interval start point and information 1540 on a protected channel access interval end point may be included in the information 1500 on the protected channel access interval. For example, the information 1520 on the protected channel access interval start point may include information on a time point when the protected channel access interval starts based on a reference time point (e.g., the time point when the beacon frame, the FILS discovery frame, or the FILS discovery frame is received). Further, the information 1540 on the protected channel access interval end point may include information on the time when the protected channel access interval ends. The unit of the information 1500 on the protected channel access interval may be micro second (ms).

The STA may acquire information on the timing of performing the channel access based on the received information on the protected channel access interval.

Hereinafter, a method for distributing the initial channel access timing of the STA that performs the initial channel access in the protected channel access interval will be disclosed in the embodiment.

Figure 16:
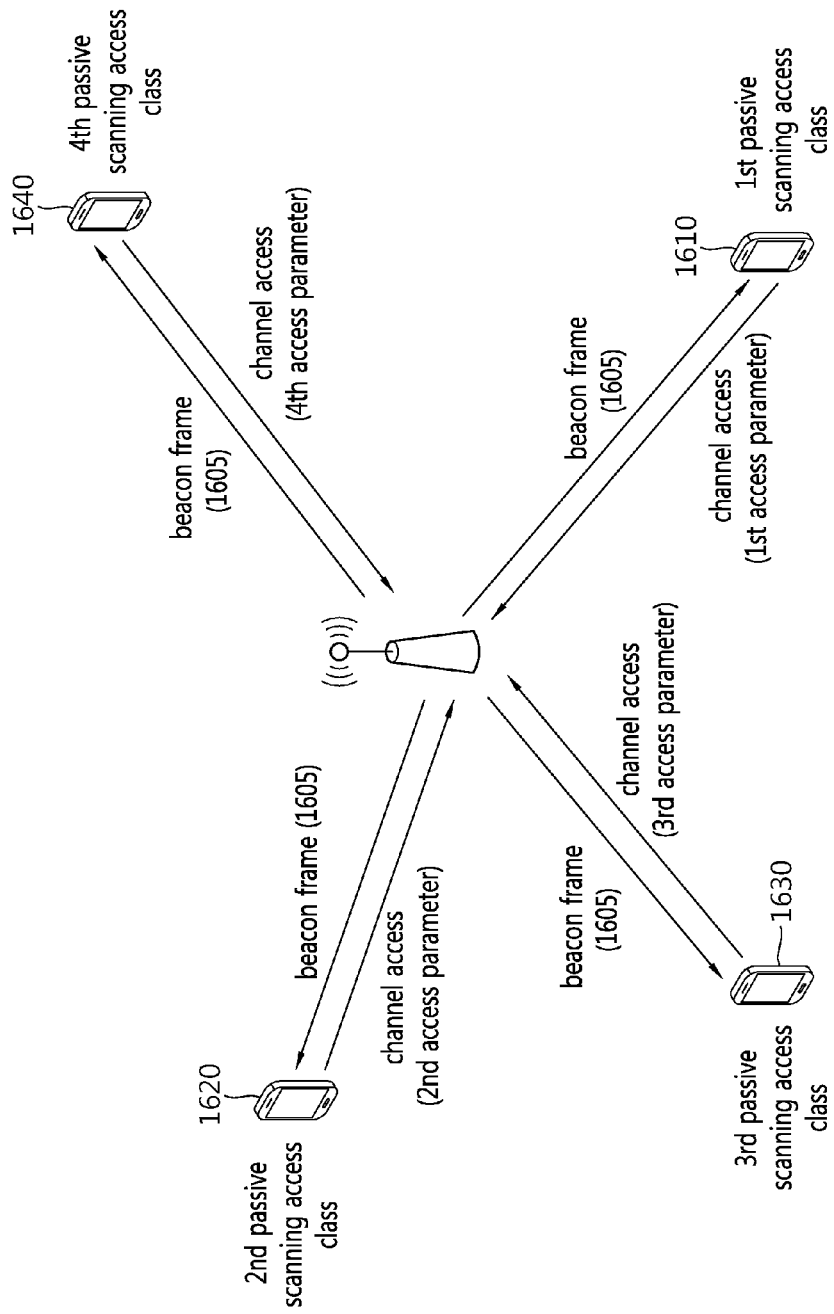
FIG. 16 is a conceptual diagram illustrating an initial access method of an STA according to an embodiment of the present invention.

FIG. 16 is a conceptual diagram illustrating an initial access method of an STA according to an embodiment of the present invention.

Referring to FIG. 16, the AP 1600 may determine channel status information (e.g., a congestion status of a radio link). The AP 1600 may use various methods in order to determine the channel status information. For example, the AP 1600 may determine the channel status based on the frame received from the neighboring STA or request the information on the channel status to the STA, and acquire information regarding whether the radio link (alternatively, channel) is congested from the STA as a response thereto. Further, the AP may acquire the information on the channel status from another AP.

According to a result of determining the channel status of the AP 1600, when the congestion status of the radio link (alternatively, channel) is more than a threshold value, the AP 1600 may allocate the access parameters (e.g., IFS, CWmin, CWmax, and TXOP) to STAs 1610, 1620, 1630, and 1640 for each scanning access class through the beacon frame 1605. Hereinafter, in the embodiment of the present invention, the present invention will be described on the assumption that access parameter sets corresponding to the respective scanning access classes are transmitted through the beacon frame for easy description. According to the embodiment of the present invention, the access parameter set may be transmitted for each scanning access class through not the beacon frame but the FILS discovery frame. Further, the access parameter set for each scanning class may be transmitted in various information formats. For example, only information on an access parameter in which the scanning access class is not indexed may be transmitted. The access parameter set is an expression assuming that the plurality of access parameters (e.g., IFS, CWmin, CWmax, and TXOP) are included. According to the embodiment of the present invention, one access parameter may be set for each access class and this case may also be included in the claims of the present invention.

The AP 1600 may also transmit the information on the congestion status of the radio link to the STAs 1610, 1620, 1630, and 1640 through the beacon frame 1605. The information on the congestion status of the radio link may be used as information on a channel congestion status as another term. For example, the AP 1600 may determine the information on the congestion status of the radio link based on information on the number of STAs which are associated at present and determine that the radio link is congested when the number of STAs which are associated at present is more than a set threshold value.

The information on the congestion status of the radio link may be indicated by, for example, 0 and 1. When the information on the congestion status of the radio link is 0, it may be indicated that radio link congestion is equal to or less than a threshold value and when the information on the congestion status of the radio link is 1, it may be indicated that the radio link congestion is more than the threshold value. The STAs 1610, 1620, 1630, and 1640 may transmit to the AP 1600 the management frame (e.g., the association request frame) based on information on the access parameter depending on the scanning access class included in the beacon frame 1605 when the information on the congestion status of the radio link included in the received beacon frame 1605 is 1.

When the information on the congestion status of the radio link included in the received beacon frame 1605 is 0, the STA applies the AC_VO which is the access class of the association request frame defined in a QoS management frame (QMF) policy in the related art to transmit the association request frame to the AP by using the access parameter calculated based on the AC_VO.

The scanning access class may be configured by a plurality of classes. The STA 1610, 1620, 1630, and 1640 may use a specific access parameter in order to transmit the association response frame. Hereinafter, the embodiment of the present invention discloses, for example, a method in which four scanning access classes are defined and the STA 1610, 1620, 1630, and 1640 transmit the management frame (e.g., the association request frame) based on the access parameter depending on the respective scanning access classes.

Four scanning access classes may be defined as a first scanning access class, a second scanning access class, a third scanning access class, and a fourth scanning access class. An access parameter set may be configured, in which at least one access parameter is different for each of the respective scanning access classes. Hereinafter, the present invention will be described on the assumption that all of the access parameters included in the access parameter set corresponding to the scanning access class are different for easy description in the embodiment of the present invention.

For example, the access parameter included in the access parameter set may be configured so that as the scanning access class has a larger value, the STA performs the initial link setup more rapidly. For example, when the scanning access class has the larger value, at least one access parameter among IFS, CWmin, and CWmax may be set to a value smaller than that when the scanning access class is a smaller value. Based on the method for configuring the access parameter set, when the scanning access class has the larger value, the STA discovers a small IFS interval and sets a small back-off time to access the channel, thereby increasing the priority of the initial link setup. Further, as the scanning access class has the larger value, a larger value may be allocated to the TXOP value. By allocating the larger value to the TXOP value, preferentially, as the scanning access class has the larger value, the priority of the initial link setup may be increased. That is, a time required for the association of the STA or the priority may vary depending on the scanning access class, that is, the access parameter set selected by the STA. Since the initial link setup timing is distributed depending on the scanning access class at the time of performing the initial link setup by using such a method, a phenomenon may be prevented, in which a collision occurs at the time of performing the initial link setup of the STA to the AP.

That is, according to the embodiment, the protected channel access interval previously described in FIGS. 14 and 15 is configured and the initial link setup timing of the STA is distributed in the protected channel access interval to perform the initial link setup.

As illustrated in FIG. 16, each of the STAS 1610, 1620, 1630, and 1640 that receive the same beacon frame 1605 from the AP 1600 may configure the scanning access class (alternatively, the access parameter set). When the radio status congestion information of the beacon frame indicates that the radio link is congested, the STA may perform the initial link setup depending on the access parameter set selected in the protected channel access interval.

For example, the first STA 1610 may decide the first scanning access class, the second STA 1620 may decide the second scanning access class, the third STA 1630 may decide the third scanning access class, and the fourth STA 1640 may decide the fourth scanning access class. In this case, the STA may perform the channel access based on the access parameter depending on each decided scanning access class. For example, the first STA 1610 may perform the channel access based on a first access parameter depending on the first scanning access class, the second STA 1620 may perform the channel access based on a second access parameter depending on the second scanning access class, the third STA 1630 may perform the channel access based on a third access parameter depending on the third scanning access class, and the fourth STA 1640 may perform the channel access based on a fourth access parameter depending on the fourth scanning access class.

The first STA and the fourth STA may perform the initial link setup based on the timing distributed in the protected channel access interval. By using such a method, the plurality of STAs 1610, 1620, 1630, and 1640 that receives the beacon frame 1605 simultaneously may distribute the transmission timing of the transmitted management frame (e.g., the association request frame) at the time of performing the channel access.

Figure 17:
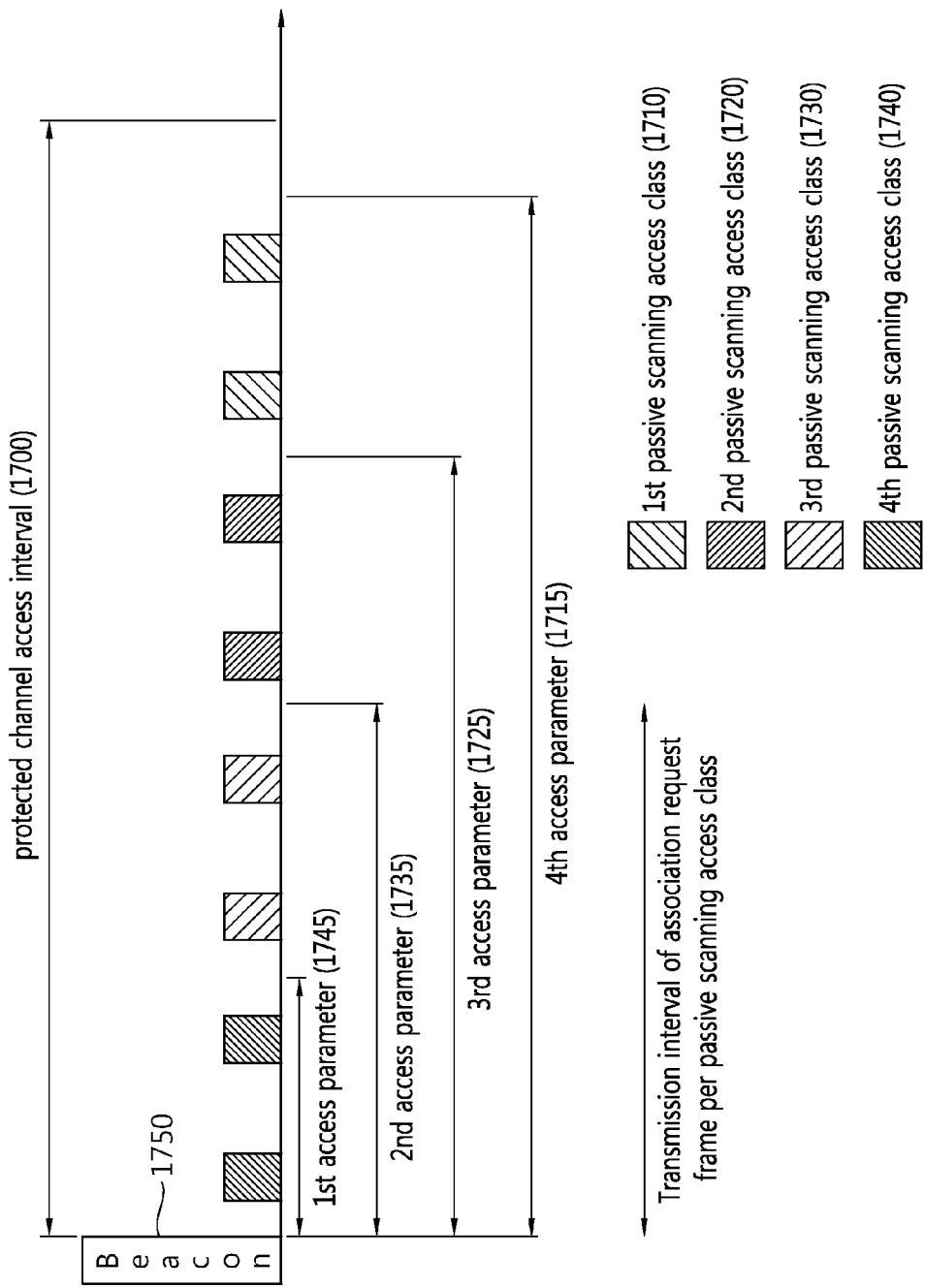
FIG. 17 is a conceptual diagram illustrating a channel access method of an STA depending on a scanning access class according to an embodiment of the present invention.

FIG. 17 is a conceptual diagram illustrating channel access of an STA depending on a scanning access class according to an embodiment of the present invention.

Referring to FIG. 17, an STA 1710 corresponding to the first scanning access class to an STA 1740 corresponding to the fourth scanning access class may perform the initial link setup based on the distributed timing in the protected channel access interval.

The STA 1740 corresponding to the fourth scanning access class may first access the channel based on a fourth access parameter 1745 and next, an STA 1730 corresponding to the third scanning access class may access the channel based on a third access parameter 1735. Next, an STA 1720 corresponding to the second scanning access class may access the channel based on a second access parameter 1725 and an STA corresponding to a first scanning access class 1710 may access the channel based on a first access parameter 1715. That is, a lot of STAs may be controlled not to simultaneously access the AP by distributing the channel access timing depending on the scanning access class.

Hereinafter, the embodiment of the present invention discloses a method in which the STA decides the scanning access class.

When the radio link congestion status information of the beacon frame received by the STA is 1, the STA selects one scanning access class to transmit the association request frame to the AP. For example, the following method may be used in order for the STA to select one scanning access class.

The STA may select a random variable between 0 and 1. The STA may select the scanning access class according to the selected random variable. Table 3 given below shows the scanning access class depending on a range of the random variable selected by the STA.

TABLE 3

| random variable | Passive scanning access class |
| --- | --- |
| 0 ≤ random variable < 0.25 | First passive scanning access class |
| 0.25 ≤ random variable < 0.5 | Second passive scanning access class |
| 0.5 ≤ random variable < 0.75 | Thrid passive scanning access class |
| 0.75 ≤ random variable < 1 | Fourth scanning access class |

The STA may randomly select the number between 0 and 1 and decide the scanning access class according to the selected random variable. The STA may transmit the association request frame to the AP based on the decided scanning access class. The scanning access class is distributed into the first to fourth scanning access classes to be selected according to the random variables randomly selected by the plurality of STAs. The association request frame is transmitted to the AP according to the distributed scanning access classes to allow the terminal to distribute the channel access timing in the protected channel access interval to transmit the association request frame.

Table 4 given below shows the access parameter set according to the scanning access class.

TABLE 4

| Passive scanning access class | CWmin | CWmax | IFS(For example, AIFS) |
| --- | --- | --- | --- |
| First passive scanning access class | (Default CWmin of AC_VO)*8 | (Default CWmax of AC_VO)*8 | (Default AIFS of AC_VO)*8 |
| Second passive scanning access class | (Default CWmin of AC_VO)*4 | (Default CWmax of AC_VO)*4 | (Default AIFS of AC_VO)*4 |
| Third passive scanning access class | (Default CWmin of AC_VO)*2 | (Default CWmax of AC_VO)*2 | (Default AIFS of AC_VO)*2 |
| Fourth passive scanning access class | (Default CWmin of AC_VO) | (Default CWmax of AC_VO) | (Default AIFS of AC_VO) |

Referring to Table 4, the access parameter sets (e.g., CWmin, CWmax, and IFS) according to the scanning access classes may be defined. The access parameter sets according to the respective scanning access classes may be decided with the access parameter value corresponding to the AC_VOC in the EDCA in the related art as a reference value. The CWmin, CWmax, and IFS values included in the access parameter sets may be set to decreased values from the first scanning access class to the fourth scanning access class. The STA corresponding to the scanning access class having the larger value may perform the initial link setup more rapidly than the STA corresponding to the scanning access class having the smaller value in the protected channel access interval by configuring the access parameter set according to the scanning access class.

The access parameter set disclosed in Table 4 is an exemplary access parameter. Different access parameter sets may be defined in order to perform the initial link setup of different STAs according to the scanning access class and the embodiment is also included in the claims of the present invention.

Table 5 given below shows another example representing the access parameter according to the scanning access class.

TABLE 5

| Passive scanning access class | CWmin | CWmax | IFS(For example, AIFS) |
| --- | --- | --- | --- |
| First passive scanning access class | CWmin of AC_BK | CWmax of AC_BK | AIFS of AC_BK |
| Second passive scanning access class | CWmin of AC_BE | CWmax of AC_BE | AIFS of AC_BE |
| Third passive scanning access class | CWmin of AC_VI | CWmax of AC_VI | AIFS of AC_VI |
| Fourth passive scanning access class | CWmin of AC_VO | CWmax of AC_VO | AIFS of AC_VO |

The access parameter set according to the scanning access class may be configured as above based on the EDCA parameter in the related art. Access parameter information according to AC_BK, AC_BE, AC_VI, and AC_VO is disclosed in a 8.4.2.31 EDCA parameter set element of IEEE Draft P802.11-REVmb™/D12, November 2011 (IEEE Standard for Information Technology—Telecommunications and information exchange between systems—Local and metropolitan area networks—Specific requirements Part 11, Wireless LAN Medium Access Control (MAC) and Physical Layer (PHY) Specifications) disclosed in November 2011.

Table 6 given below exemplarily shows the access parameters according to AC_BK, AC_BE, AC_VI, and AC_VO when dot11OCBActivated defined in the IEEE Draft P802.11-REVmb™/D12 in the related art has a true value. The access parameters included in the access parameter sets such as CWmin, CWmax, AIFSN, and TXOP may be configured differently according to AC_BK, AC_BE, AC_VI, and AC_VO.

TABLE 6

| AC | CWmin | CWmax | AIFSN | TXOP Limit OFDM/CCK-OFDM PHY |
|---|---|---|---|---|
| AC_BK | aCWmin | aCWmax | 9 | 0 |
| AC_BE | aCWmin | aCWmax | 6 | 0 |
| AC_VI | (aCWmin + 1)/2-1 | aCWmin | 3 | 0 |
| AC_VO | (aCWmin + 1)/4-1 | (aCWmin + 1)/2-1 | 2 | 0 |

Referring back to Table 5, in the embodiment of the present invention, the access parameter according to the scanning access class may be decided based on the access parameter sets of AC_BK, AC_BE, AC_VI, and AC_VO used in the EDCA in the related art.

Hereinafter, a method for applying a scaling element of the access parameter will be disclosed.

The AP may change the access parameter according to the radio link congestion status information included in the beacon frame, the FILS discovery frame, or the probe response frame. For example, the AP transmits an additional scaling element (e.g., N) to the STA to allow the STA to change the access parameter used at the time of performing the initial link setup. The STA may change the access parameter set configured based on the received scaling element and perform the initial link setup based on the changed access parameter set.

For example, as shown in Table 4 described above, the STA may decide the access parameter to be used in the initial link setup based on default access parameters (default, CWmin, default CWmax, and default IFS) and the scaling element transmitted by the AP. When the scaling element has a value of N, the access parameters which the STA will use in the initial link setup may be decided as (CWmin*N), (CWmax*N), and (AIFS*N). The STA may transmit the association request frame based on the access parameter decided in the protected channel access interval.

For example, as shown in Table 7 given below, the access parameter defined in each scanning access class of Table 4 is set as the default access parameter and each access parameter is multiplied by N to perform scaling.

TABLE 7

| Passive scanning access class | CWmin | CWmax | IFS(For example, AIFS) |
|---|---|---|---|
| First passive scanning access class | (Default CWmin of AC_VO)*8*N | (Default CWmax of AC_VO)*8*N | (Default AIFS of AC_VO)*8 |
| Second passive scanning access class | (Default CWmin of AC_VO)*4*N | (Default CWmax of AC_VO)*4*N | (Default AIFS of AC_VO)*4 |
| Third passive scanning access class | (Default CWmin of AC_VO)*2*N | (Default CWmax of AC_VO)*2*N | (Default AIFS of AC_VO)*2 |

TABLE 7-continued

| Passive scanning access class | CWmin | CWmax | IFS(For example, AIFS) |
|---|---|---|---|
| Fourth passive scanning access class | (Default CWmin of AC_VO)*N | (Default CWmax of AC_VO)*N | (Default AIFS of AC_VO)*N |

By using such a method, the access parameter of the STA may be set more adaptively according to the channel situation. The aforementioned embodiment discloses that the STA decides the access parameter through the scanning access class decided based on the random variable for easy description. However, the STA may decide the random variable and immediately decide the access parameter according to the random variable. That is, the STA may decide the access parameter set which the STA will use based on the random variable without a procedure for deciding a separate index called the scanning access class.

For example, when the information on the channel status of the received beacon frame or FILS discovery frame indicates that the radio link is congested, the STA may select the random variable. The STA may select one access parameter set among the plurality of access parameters based on the selected random variable. The STA may transmit the association request frame to the AP by performing the initial channel access based on the selected access parameter. That is, the scanning access class disclosed in the embodiment of the present invention serves as one index for the STA to select the access parameter set and the STA may select one of the access parameter sets transmitted through the beacon frame without indexing the scanning access class.

According to yet another embodiment of the present invention, the terminal may configure the access parameter set by a value acquired by multiplying the default access parameter by N without particularly defining the scanning access class. That is, the terminal may perform the initial link setup based on the value of N which is the scaling element included in the frame transmitted by the AP without deciding the scanning access class. By such a method, the N value may vary depending on the STA that receives the beacon frame, the STA that receives the probe response frame, and the STA that receives the FILS discovery frame and the STAs may perform the channel access based on different access parameters. The STA decides the default CWmin*N, default CWmax*N, and default AIFS*N as the access parameters based on the N value which is the scaling element received through the frame to perform the channel access in the protected channel access interval.

According to the embodiment of the present invention, the terminal may adaptively select the scanning access class according to a radio link congestion level. In the aforementioned channel access method of the STA, only when the radio link is congested based on radio link congestion level information transmitted by the AP (for example, when the radio link congestion level is 0), an initial link setup procedure according to the scanning access class is performed. Moreover, even when the radio link congestion level information transmitted by the AP indicates that the radio link is not congested (for example, when the radio link congestion level is 1), the initial link setup according to the scanning access class may be performed.

In the embodiment of the present invention, the scanning access class according to a random variable interval selected by the STA is configured differently according to the radio link congestion level to select the scanning access class or the access parameter set at different ratios according to the radio link congestion level. As the same meaning, the access parameter set according to the random variable selected by the STA may be configured differently according to the radio link congestion level. Hereinafter, the present invention will be described on the assumption that the STA decides the scanning access class for easy description in the embodiment of the present invention. However, as described above, the STA may directly decide the access parameter set without the procedure of deciding the scanning access class.

For example, when the radio link congestion level of the beacon frame received by the STA indicates that the radio link is not congested, relative more STAs may be configured to select a higher scanning access class (e.g., the third scanning access class or the fourth scanning access class). For example, a range of the random variable in which the third scanning access class or the fourth scanning access class may be selected may be extended so as for the relatively more STAs to select the higher scanning access class as described above. Table given below is a table for dividing the scanning access class according to the random variable.

TABLE 8

| random variable | Passive scanning access class |
| --- | --- |
| 0 ≤ random variable < 0.15 | First passive scanning access class |
| 0.15 ≤ random variable < 0.3 | Second passive scanning access class |
| 0.3 ≤ random variable < 0.5 | Thrid passive scanning access class |
| 0.5 ≤ random variable < 1 | Fourth scanning access class |

Fourth Passive Scanning Access Class

Referring to Table 8, the interval of the random variable selected as the third scanning access class and the fourth scanning access class may be extended so as to select the third scanning access class and the fourth scanning access class more frequently according to the random variable selected by the STA. The interval of the random variable according to the scanning access class of Table 8 is an interval arbitrarily defined so as for the STA to decide the higher scanning access class with a relatively higher probability according to the random variable selected by the STA. The random variable interval configured in Table 8 may vary.

Further, when it is indicated that the radio link congestion level is low in the received beacon frame, relatively more STAs may be configured to select a lower scanning access class (e.g., the first scanning access class or the second scanning access class). For example, a range in which the first scanning access class or the second scanning access class may be extended by the random variable selected by the STA so as for the relatively more STAs to select the lower scanning access class as described above. Table 9 given below is a table for dividing the scanning access class according to the random variable.

TABLE 9

| random variable | Passive scanning access class |
| --- | --- |
| 0 ≤ random variable < 0.5 | First passive scanning access class |
| 0.5 ≤ random variable < 0.7 | Second passive scanning access class |
| 0.7 ≤ random variable < 0.85 | Thrid passive scanning access class |
| 0.85 ≤ random variable < 1 | Fourth scanning access class |

Referring to Table 9, the interval of the random variable selected as the first scanning access class and the second scanning access class may be extended so as to select the first scanning access class and the second scanning access class more frequently according to the random variable selected by the STA. The interval of the random variable according to the scanning access class of Table 9 is an interval arbitrarily defined so as for the STA to decide the lower scanning access class with the relatively higher probability according to the random variable selected by the STA. The random variable interval configured in Table 9 may vary.

The aforementioned embodiment discloses a method in which the STA receives at least one pieces of information of the information on the protected channel access interval, the information on the link congestion status, and the information on the access parameter according to the scanning access class based on the beacon frame and/or the FILS discovery frame and performs the channel access based on the received information. However, even the probe response frame received when the STA performs active scanning may include at least one piece of information including the information on the protected channel access interval, the information on the link congestion status, and the information on the access parameter according to the scanning access class, and a subsequent operation of the STA may be performed similarly to that when at least one piece of information of the information on the protected channel access interval, the information on the link congestion status, and the information on the access parameter according to the scanning access class based on the beacon frame and/or the FILS discovery frame is received.

Figure 18:
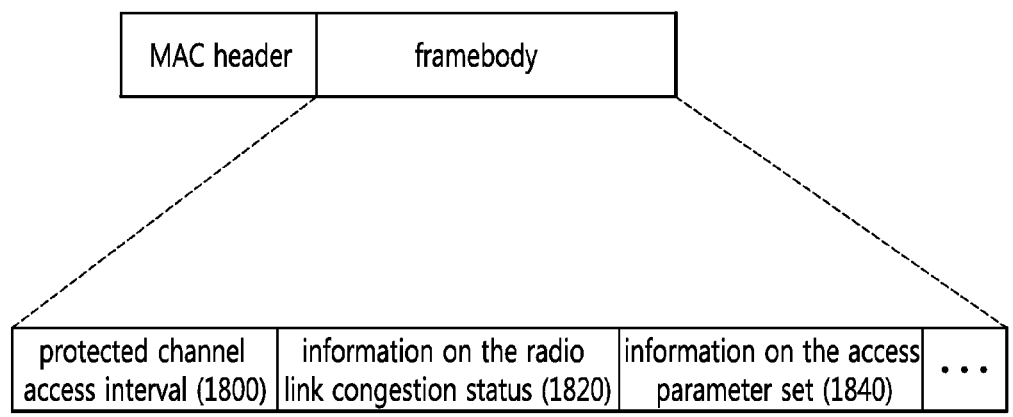
FIG. 18 is a conceptual diagram illustrating a frame format according to an embodiment of the present invention.

FIG. 18 is a conceptual diagram illustrating a frame format according to an embodiment of the present invention.

In FIG. 18, the AP encapsulates information 1800 on the protected channel access interval, information 1820 on the link congestion status, and information 1840 on the access parameter set included in the beacon frame, the FILS discovery, and the probe response frame to transmit the beacon frame, the FILS discovery, and the probe response frame.

The information 1800 on the protected channel access interval may include information on an interval in which the terminal performing the initial link setup transmits the frames (e.g., the authentication request frame, the association request frame, and the like) for the initial link setup. For example, when the information on the protected channel access interval is set to 1, the set 1 may instruct the AP to permit only the transmission of the frame for performing the initial channel access in the protected channel access interval. On the contrary, when the information on the protected channel access interval is set to 0, the set 0 may instruct the AP to permit even transmission of another frame in addition to the frame for performing the initial channel access in the protected channel access interval. A value for an interval may be included in a protected channel access interval specific to the information on the protected channel access interval. The STA may acquire information on an interval used for the initial link setup based on the information 1800 on the protected channel access interval. For example, the protected channel access interval start point may include information on a time point when the protected channel access interval starts based on a reference time point (e.g., the time point when the beacon frame, the FILS discovery frame, or the FILS discovery frame is received or received). Further, the protected channel access interval end point may include information on the time when the protected channel access interval ends. The unit of the information on the protected channel access interval may be micro second (ms).

The radio link congestion status information 1820 may include information on a channel status of a current AP. For example, according to a result in which the AP determines the channel status, when the channel is congested, the radio link congestion status information 1802 is set to 0 to be transmitted to the STA. On the contrary, according to the result in which the AP determines the channel status, when the channel is not congested, the radio link congestion status information 1802 is set to 1 to be transmitted. Whether the channel is congested may be determined based on, for example, a frame received from a neighboring STA or the information on the channel status may be requested to the STA and the radio link congestion status information 1820 may be acquired based on the requested information. Further, the AP may acquire the information on the channel status from another AP. For example, the AP may count and measure the management frames (e.g., the probe request frame, the association request frame, and the authentication request frame) which the AP receives for the purpose of the initial link setup. As yet another example, the AP may define a link level based on load information of the BSS.

The access parameter set which the STA will use in the initial link setup may be decided differently based on the information 1820 on the radio link congestion status.

The information 1840 on the access parameter set may include the plurality of access parameter sets for the STA to perform the initial link setup at the distributed timing.

The STA may decide the scanning access class and perform the initial channel access based on the access parameter decided according to the access parameter information 1820 depending on the received scanning access class. Alternatively, the STA may decide the access parameter set according to the random variable and perform the initial link setup based on the decided access parameter set.

The access parameter set according to the scanning access class is not separately transmitted through the beacon frame, the FILS discovery frame, or the probe response frame and may be defined in the AP and/or the STA in advance. In this case, the beacon frame, the FILS discovery frame, or the probe response frame may not include the access parameter information depending on the scanning access class.

Further, the beacon frame, the FILS discovery frame, or the probe response frame may additionally include an access parameter scaling element depending on the scanning access class.

Figure 19:
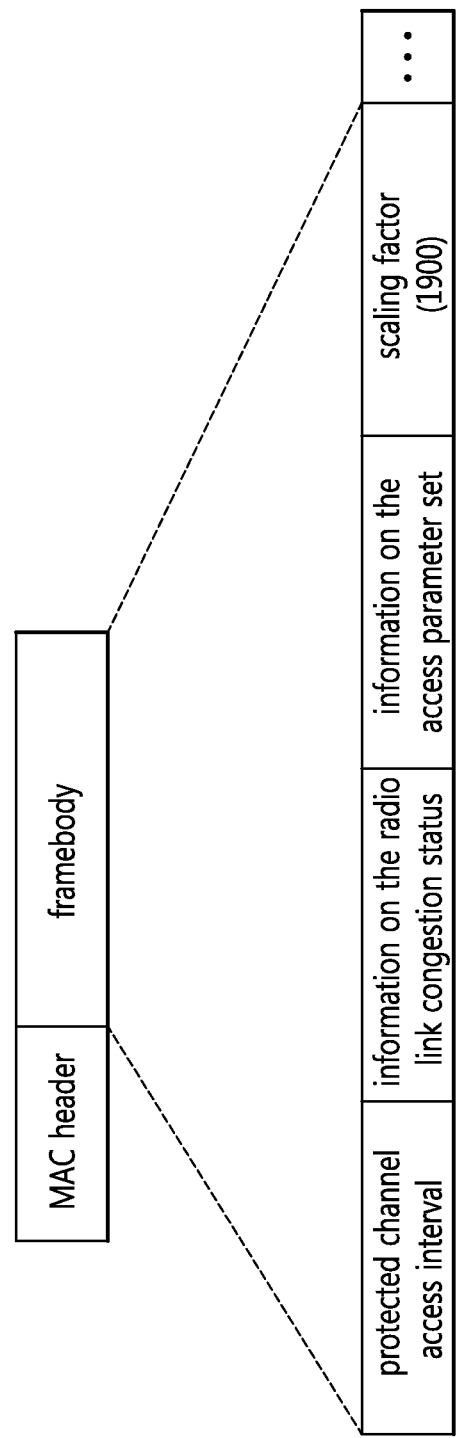
FIG. 19 is a conceptual diagram illustrating a frame format according to the embodiment of the present invention.

FIG. 19 is a conceptual diagram illustrating a frame format according to the embodiment of the present invention.

Referring to FIG. 19, the beacon frame, the FILS discovery frame, or the probe response frame additionally include a scaling element (or factor) 1900 to be transmitted.

The STA may define the default access parameters (default CWmin, default CWmax, and default IFS) and decide an access parameter value which the STA will use based on the scaling element 1900 transmitted by the AP. As described above, the default access parameter is multiplied by N which is the scaling element to decide the access parameter.

According to yet another embodiment of the present invention, the protected channel access interval may be configured based on the priority.

The protected channel access interval may be expressed as the protected channel access interval as another term and a priority field may be expressed as information on an STA that is accessible to the channel in the protected channel access interval.

For example, the beacon frame, the FILS discovery frame, or the probe response frame includes the priority field to be transmitted. The priority field may include information on the STA that may perform the channel access in the protected channel access interval. For example, the priority field may be defined as shown in Table 10 given below.

A user priority may be, for example, information corresponding to the aforementioned scanning access class. The user priority may decided according to the random variable decided by the STA and the random variable interval may be for deciding the user priority may be configured differently according to the channel status information.

TABLE 10

| bit | Initial link setup priority | Description |
| --- | --- | --- |
| Bit 0 | 0 | User priority 4~7 STA performing initial link setup |
| Bit 1 | 1 | User priority 0~3 STA performing initial link setup |
| Bit 2 | 2 | STA performing initial link setup |
| Bit 3 | 3 | STA already performing initial link setup |

Referring to Table 10, when bit 0 has a value of '1', STAs corresponding to user priorities 4 to 7 in the protected channel access interval may perform the initial link setup. When bit 1 has the value of 1 STAs corresponding to user priorities 1 to 3 in the protected channel access interval may perform the initial link setup. When bit 2 has the value of '1', an STA that performs the initial link setup in the protected channel access interval may perform the initial link setup. When bit 3 has the value of '1', an STA that already performs the initial link setup in the protected channel access interval may perform the channel access. The user priority may be decided by various methods. For example, the user priority may be selected based on the random variable selected by the STA similarly to the method for deciding the scanning access class. Further, the user priority may be decided according to a specification of the STA.

When a bit of the priority bit is set to 0, an STA corresponding to the corresponding bit may not perform the initial link setup during the protected channel access interval or may not transmit traffic data to the AP through the channel access.

On the contrary, when the priority bit is set to 1, the STA corresponding to the corresponding bit may perform the initial link setup during the protected channel access interval or may transmit the traffic data to the AP through the channel access.

In Table 10, a configuration of the priority field is one example. The priority field as a field including information on the priority to perform the channel access in the protected channel access interval may be decided in various formats. For example, when a first bit included in a bitmap is 1, an STA corresponding to a first channel access priority may perform the initial channel access in the protected channel access interval and when a second bit included in the bitmap is 1, an STA corresponding to a second channel access priority may perform the initial channel access in the protected channel access interval. Further, when a third bit included in the bitmap is 1, the bit of 1 may instruct an STA that already performs the initial channel access to perform the channel access in the protected channel access interval.

When the STA receives a frame including information on the channel status, information on the protected channel access interval, and information (e.g., the priority field) on the STA that may perform the channel access in the protected channel access interval from the AP, the STA may perform the following operation. When the information on the channel status indicates the congestion of the radio link, the STA may decide the channel access priority. For example, the STA may decide the channel access priority based on the random variable as described above. The STA may perform the initial channel access in the protected channel access interval based on the decided channel access priority and the information on the STA that may perform the channel access in the protected channel access interval.

The STA may use the following method in order to decide the channel access priority. The STA may select one channel access priority among N (is a natural number of N>1) channel access priorities decided based on the selected random variable. The random variable selected by the STA may be included in one random variable range among N (is the natural number of N>1) random variable ranges. N random variable ranges may correspond to N channel access priorities, respectively and one channel access priority selected by the STA may correspond to one random variable range. That is, the STA may select the channel access priority corresponding to the selected random variable.

When the channel status of the AP is not good, the information on the radio link congestion status may be set to 1 and the priority field may be transmitted, but as yet another embodiment, when the AP does not include the information on the radio link congestion status and a link status is not good, the channel access of the STA may be limited in the protected channel access interval by transmitting only a link setup bitmap. That is, the STA may acquire information regarding whether the channel access being limited in the protected channel access interval according to existence of the priority field.

Figure 20:
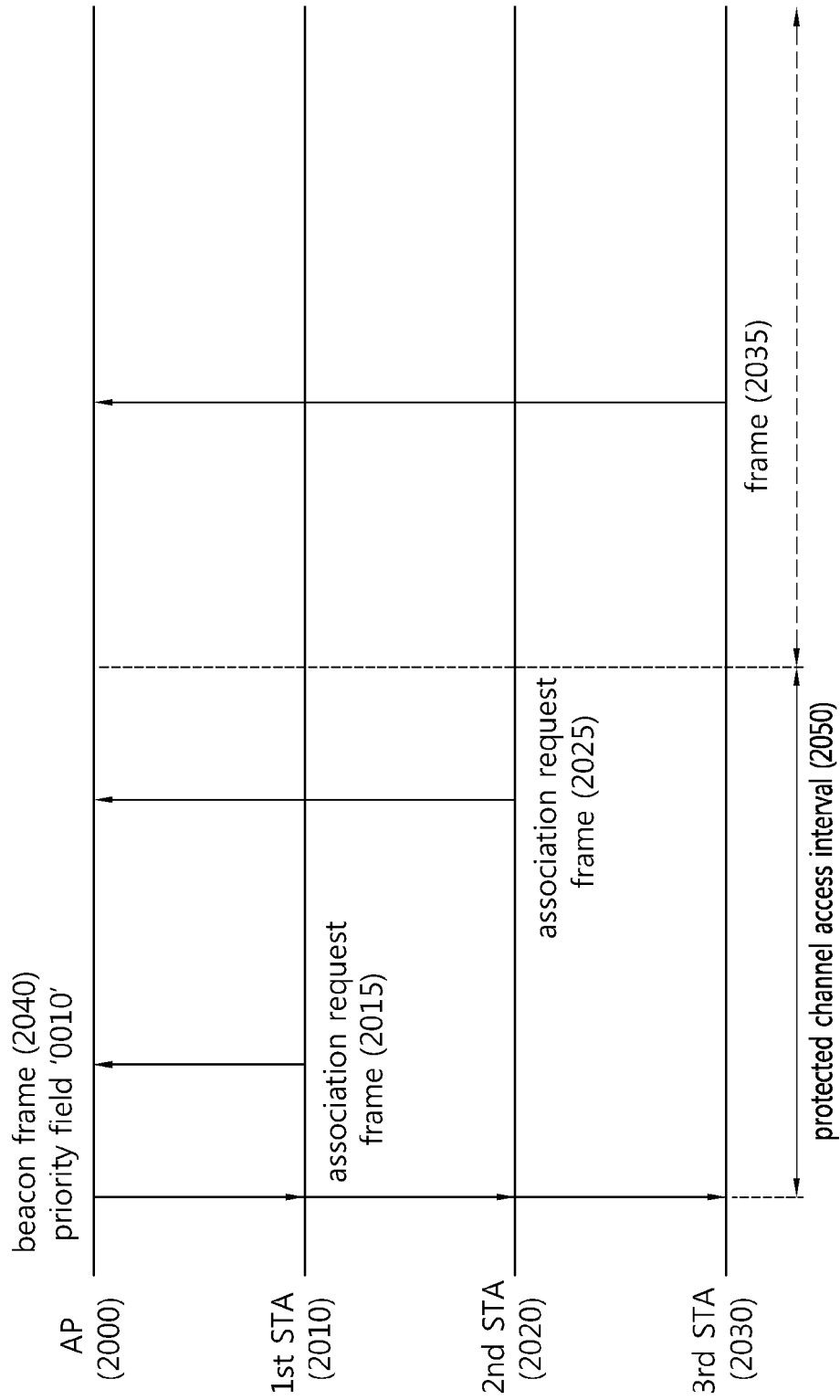
FIG. 20 is a conceptual diagram illustrating a channel access method of an STA according to an embodiment of the present invention.

FIG. 20 is a conceptual diagram illustrating a channel access method of an STA according to an embodiment of the present invention.

FIG. 20 illustrates an embodiment of a method in which the STA performs the channel access based on the received priority field and the protected channel access interval.

Referring to FIG. 20, for example, it is assumed that bit 3 of the priority included in the beacon frame received by the STA may be set to 0 and the information on the protected channel access interval is included. That is, the AP may transmit the beacon frame in which the bit 3 of the priority field is set to 0 and which includes the information on the protected channel access interval.

When the first STA and the second STA are STAs that perform the initial link setup and the third STA is an STA that performs the initial link setup, the following operation may be performed.

Only the first STA and the second STA that perform the initial link setup in the protected channel access interval may perform the initial link setup. The first STA and the second STA may transmit the association request frame in the protected channel access interval. The third STA already associated with the AP, which performs the initial link setup may not perform the channel access in the protected channel access interval. The third STA already associated with the AP may transmit the frame through the channel access in an interval over the protected channel access interval.

The priority may be given to the channel access of the STA for the initial link setup based on the configuration of the priority field and the protected channel access interval.

Figure 21:
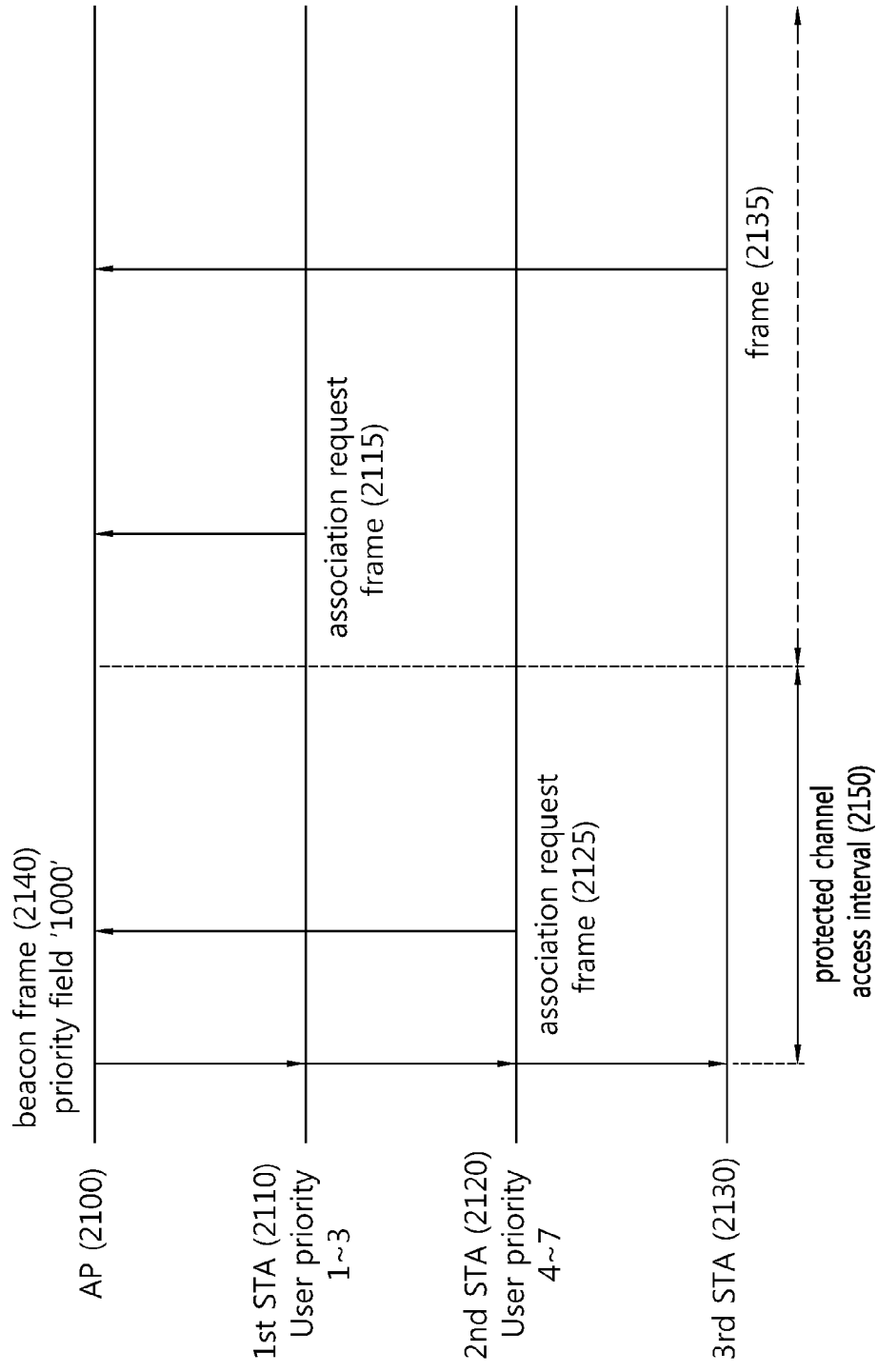
FIG. 21 is a conceptual diagram illustrating a channel access method of an STA according to an embodiment of the present invention.

FIG. 21 is a conceptual diagram illustrating a channel access method of an STA according to an embodiment of the present invention.

FIG. 21 illustrates an embodiment of a method in which the STA performs the channel access based on the received priority field and the protected channel access interval.

Referring to FIG. 21, for example, it may be assumed that bit 0 of the priority included in the beacon frame received by the STA may be set to 1, remaining bits 1 to 3 may be set to 0, and the information on the protected channel access interval is included. That is, the AP may set a bit in which the priority field corresponds to '1000' in the beacon frame and transmit the bit including the information on the protected channel access interval.

In this case, only the second STA corresponding to user priorities 4 to 7 in the protected channel access interval may perform the initial link setup. The second STA may transmit the association request frame in the protected channel access interval. The first STA corresponding to user priorities 1 to 3 and the third STA already associated with the AP, which performs the initial link setup may not perform the channel access in the protected channel access interval. The first STA corresponding to user priorities 1 to 3 and the third STA already associated with the AP, which performs the initial link setup may transmit the association request frame and the frame through the channel access after the protected channel access interval ends.

According to yet another embodiment of the present invention, the link setup bitmap is defined in the priority field as shown in a table given below and included in the beacon frame, the FILS discovery frame, or the probe response frame to be transmitted.

TABLE 11

| bit | Description |
|---|---|
| Bit 0 | User priority 4~7 |
| | STA performing initial link setup |
| Bit 1 | User priority 0~3 |
| | STA performing initial link setup |
| Bit 2 | STA performing initial link setup |
| Bit 3 | STA already performing initial link setup |

Table 11 shows a link setup bitmap for representing whether to access the channel in the protected channel access interval. Table 11 is one example for the link setup bitmap.

When the bit included in the link setup bitmap of Table 11 is set to '1', the set 1 may instruct the STA corresponding to the bit set to 1 not to transmit the frame in the protected channel access interval.

The AP may set the radio link congestion status information (alternatively, channel congestion status information) of the frame to 1 and transmit the radio link congestion status information including the link setup bitmap to the STA. For example, it may be assumed that the AP sets the radio link congestion status information to 1, and sets bit 1 in the link setup bitmap to 1 and transmits the set bit 1. Terminals corresponding to user priorities 4 to 7 among terminals that perform the initial link setup may determine that the channel status is not good for a time corresponding to the protected channel access interval. The terminals corresponding to user priorities 4 to 7 among the terminals that perform the initial link setup may transmit the management frame for performing the initial link setup after the protected channel access interval elapses without performing the channel access in the protected channel access interval.

As yet another embodiment, when the AP does not include the information on the radio link congestion status the AP and the link status is not good, the AP transmits only the link setup bitmap to limit the channel access of the STA in the protected channel access interval. That is, the STA may acquire the information regarding whether the channel access being limited in the protected channel access interval according to the existence of the priority field.

Figure 22:
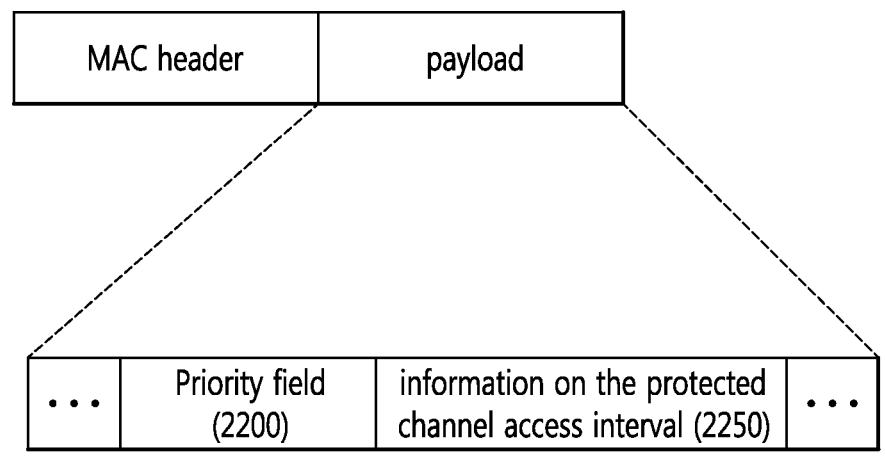
FIG. 22 is a conceptual diagram illustrating a frame format according to the embodiment of the present invention.

FIG. 22 is a conceptual diagram illustrating a frame format according to the embodiment of the present invention.

Referring to FIG. 22, the beacon frame, the FILS discovery frame, or the probe response frame may include a priority field 2200 and information 2250 on the protected channel access interval.

As described above, the priority field 2200 may include information on a priority to perform the channel access in the protected channel access interval. As shown in Table 10, the priority field 2200 may include the information on the priority based specific bit information and include the priority information in various information formats.

In the information 2250 on the protected channel access interval, a value for an interval may be included in a specific protected channel access interval. The STA may acquire information on an interval used for the initial link setup based on the information 2250 on the protected channel access interval. For example, information 2260 on a protected channel access interval start point and information 2270 on a protected channel access interval end point may be included in the information 2200 on the protected channel access interval. For example, the information 2250 on the protected channel access interval start point may include information on a time point when the protected channel access interval starts based on a reference time point (e.g., the time point when the beacon frame, the FILS discovery frame, or the FILS discovery frame is transmitted or received). Further, the information 2260 on the protected channel access interval end point may include information on the time when the protected channel access interval ends. The unit of the information 2250 on the protected channel access interval may be micro second (ms).

The STA may acquire information on the timing of performing the channel access based on the received information on the protected channel access interval.

Figure 23:
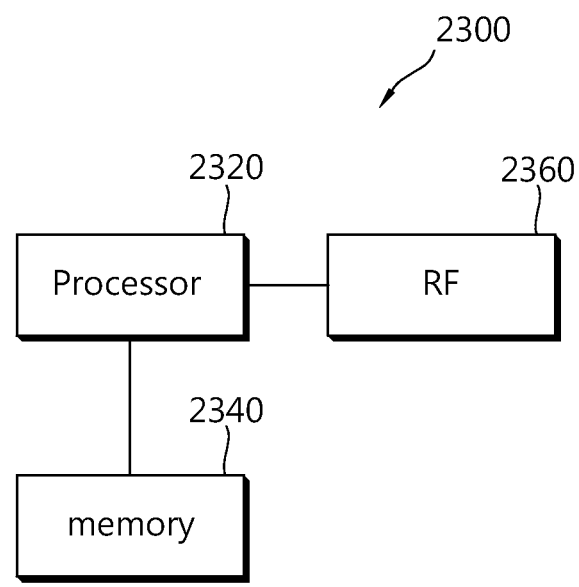
FIG. 23 is a block diagram illustrating a wireless apparatus to which the embodiment of the present invention can be applied.

FIG. 23 is a block diagram illustrating a wireless device to which an embodiment of the present invention may apply.

Referring to FIG. 23, the wireless device 2300 may be an STA that may implement the above-described embodiments, and the wireless device 2300 may be an AP or a non-AP STA (station).

The wireless device 2300 includes a processor 2320, a memory 2340, and an RF (Radio Frequency) unit 2360.

The RF unit 2360 may be connected with the processor 2320 to transmit/receive radio signals.

The processor 2320 implements functions, processes, and/or methods as proposed herein. For example, the processor 2320 may be implemented to perform the operation of the above-described wireless device according to an embodiment of the present invention.

For example, the processor 2320, in case the wireless device is an AP, may be implemented to generate a frame including information on a channel status, information on a protected channel access interval, and information on an STA which is accessible to a channel in the protected channel access interval and transmit the frame to STA.

Further, the processor 2320, in case the wireless device is an STA, may be implemented to receive a frame including information on a channel status, information on a protected channel access interval, and information on an STA which is accessible to a channel in the protected channel access interval, from an access point (AP) and decide a channel access priority when the information on the channel status indicates that a radio link is congested. The processor 2320 may be implemented to perform the initial channel access in the protected channel access interval based on the decided channel access priority and the information on the STA which is accessible to the channel in the protected channel access interval.

The processor 2320 may include an ASIC (Application-Specific Integrated Circuit), other chipset, a logic circuit, a data processing device, and/or a converter that performs conversion between a baseband signal and a radio signal. The memory 2340 may include a ROM (Read-Only Memory), a RAM (Random Access Memory), a flash memory, a memory card, a storage medium, and/or other storage device. The RF unit 2360 may include one or more antennas that transmit and/or receive radio signals.

When an embodiment is implemented in software, the above-described schemes may be embodied in modules (processes, or functions, etc.) performing the above-described functions. The modules may be stored in the memory 2340 and may be executed by the processor 2320. The memory 2340 may be positioned in or outside the processor 2320 and may be connected with the processor 2320 via various well-known means.

What is claimed is:

1. A method for performing, by a station (STA), initial channel access in a wireless LAN, the method comprising:
receiving, by the STA, a frame including information on a channel status, information on a protected channel access interval, and information on an STA which is accessible to a channel in the protected channel access interval, from an access point (AP);
deciding, by the STA, a channel access priority when the information on the channel status indicates that a radio link is congested; and
performing, by the STA, the initial channel access in the protected channel access interval based on the decided channel access priority and the information on the STA which is accessible to the channel in the protected channel access interval,
wherein the information on the protected channel access interval includes information on a time limited so as for only the STA which is accessible to the channel in the protected channel access interval to performs channel access,
wherein the information on the STA which is accessible to the channel in the protected channel access interval indicates an STA which is permitted to access the channel in the protected channel access interval based on a bitmap,
wherein when a first bit included in the bitmap is a predetermined value, the first bit instructs an STA corresponding to a first channel access priority to perform the initial channel access in the protected channel access interval,
wherein when a second bit included in the bitmap is the predetermined value, the second bit instructs an STA corresponding to a second channel access priority to perform the initial channel access in the protected channel access interval, and
wherein when a third bit included in the bitmap is the predetermined value, the third bit instructs an STA that already performs the initial channel access to perform the channel access in the protected channel access interval.

2. The method of claim 1,
wherein the channel access priority is one channel access priority among N (is a natural number of N>1) channel access priorities decided based on a random variable selected by the STA,
wherein the selected random variable is included in one random variable range among N (is the natural number of N>1) random variable ranges,
wherein the N random variable ranges correspond to the N channel access priorities, respectively, and
wherein the one channel access priority corresponds to the one random variable range.

3. The method of claim 2,
wherein the size of the N random variable ranges is decided differently in accordance with the information on the channel status.

4. The method of claim 1,
wherein the frame is a beacon frame, a fast initial link setup (FILS) discovery frame, or a probe response frame.

5. The method of claim 1,
wherein the information on the protected channel access interval includes information on a start point of the protected channel access interval and information on an end point of the protected channel access interval.

6. A station (STA) for performing scanning in a wireless LAN, the station comprising:
an radio frequency (RF) unit configured to transmit and receive a radio signal; and
a processor operatively connected with the RF unit and configured to:
receive a frame including information on a channel status, information on a protected channel access interval, and information on an STA which is accessible to a channel in the protected channel access interval, from an access point (AP),
decide a channel access priority when the information on the channel status indicates that a radio link is congested, and
perform initial channel access in the protected channel access interval based on the decided channel access priority and the information on the STA which is accessible to the channel in the protected channel access interval, and
the information on the protected channel access interval includes information on a time limited so as for only the STA which is accessible to the channel in the protected channel access interval to performs channel access wherein the information on the STA which is accessible to the channel in the protected channel access interval indicates an STA which is permitted to access the channel in the protected channel access interval based on a bitmap,
wherein when a first bit included in the bitmap is a predetermined value, the first bit instructs an STA corresponding to a first channel access priority to perform the initial channel access in the protected channel access interval,
wherein when a second bit included in the bitmap is the predetermined value, the second bit instructs an STA corresponding to a second channel access priority to perform the initial channel access in the protected channel access interval, and
wherein when a third bit included in the bitmap is the predetermined value, the third bit instructs an STA that already performs the initial channel access to perform the channel access in the protected channel access interval.

7. The STA of claim 6,
wherein the channel access priority is one channel access priority among N (is a natural number of N>1) channel access priorities decided based on a random variable selected by the STA,
wherein the selected random variable is included in one random variable range among N (is the natural number of N>1) random variable ranges,
wherein the N random variable ranges correspond to the N channel access priorities, respectively, and
wherein the one channel access priority corresponds to the one random variable range.

8. The STA of claim 6,
wherein the size of the N random variable ranges is decided differently in accordance with the information on the channel status.

9. The STA of claim 6,
wherein the frame is a beacon frame, a fast initial link setup (FILS) discovery frame, or a probe response frame.

10. The STA of claim 6,
wherein the information on the protected channel access interval includes information on a start point of the protected channel access interval and information on an end point of the protected channel access interval.

* * * * *